United States Patent
Miyazaki et al.

(10) Patent No.: US 8,888,197 B2
(45) Date of Patent: Nov. 18, 2014

(54) BRAKE SYSTEM

(75) Inventors: Tetsuya Miyazaki, Toyota (JP); Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 125 days.

(21) Appl. No.: 13/518,171

(22) PCT Filed: Feb. 2, 2010

(86) PCT No.: PCT/JP2010/051404
§ 371 (c)(1),
(2), (4) Date: Jun. 21, 2012

(87) PCT Pub. No.: WO2011/096039
PCT Pub. Date: Aug. 11, 2011

(65) Prior Publication Data
US 2012/0256477 A1 Oct. 11, 2012

(51) Int. Cl.
*B60T 13/00* (2006.01)
*B60T 8/88* (2006.01)
*B60T 13/16* (2006.01)
*B60T 8/94* (2006.01)
*B60T 8/40* (2006.01)

(52) U.S. Cl.
CPC ............ *B60T 8/885* (2013.01); *B60T 13/168* (2013.01); *B60T 13/165* (2013.01); *B60T 8/94* (2013.01); *B60T 8/4081* (2013.01); *B60T 2270/402* (2013.01)
USPC .................. 303/9.61; 303/122.04; 303/116.2; 303/122.1

(58) Field of Classification Search
CPC ....... B60T 13/148; B60T 13/142; B60T 8/40; B60T 8/4013
USPC .................... 303/9.61, 10, 189, 116.1, 116.2, 303/122.09, 122.1, 122.12–122.14, 187
See application file for complete search history.

(56) References Cited

U.S. PATENT DOCUMENTS 5,061,016 A 10/1991 Hirobe
(Continued)

FOREIGN PATENT DOCUMENTS

JP 10 287227 10/1998
(Continued)

OTHER PUBLICATIONS

International Search Report Issued May 18, 2010 in PCT/JP10/51404 Filed Feb. 2, 2010.
(Continued)

*Primary Examiner* — Thomas Irvin
(74) *Attorney, Agent, or Firm* — Oblon, Spivak, McClelland, Maier & Neustadt, L.L.P.

(57) ABSTRACT

A brake system including: (a) a manual hydraulic pressure source; (b) a power hydraulic pressure source; (c) a high pressure generator for generating high pressure, by utilizing pressure of the power hydraulic pressure source; (d) a common passage to which first and second brake cylinders and the high pressure generator are connected; (e) a high-pressure-generator cut-off valve disposed between the common passage and the high pressure generator; (f) a first manual-pressure-source passage connecting a first individual passage and the manual hydraulic pressure source; (g) a first manual-pressure-source cut-off valve provided in the first manual-pressure-source passage; (h) a first valve provided between the second brake cylinder and a connected portion of the first individual passage which is connected to the first manual-pressure-source passage; and (i) a pressure-supply control device for controlling supply of pressure to the brake cylinders, by controlling the high-pressure-generator cut-off valve, first valve and first manual-pressure-source cut-off valve.

19 Claims, 15 Drawing Sheets

(56) References Cited

U.S. PATENT DOCUMENTS

| | | |
|---|---|---|
| 6,070,953 A | 6/2000 | Miyago |
| 6,142,586 A | 11/2000 | Sakai |
| 6,412,882 B1 | 7/2002 | Isono et al. |
| 6,425,644 B2 * | 7/2002 | Kawahata et al. ............ 303/122 |
| 6,880,900 B2 * | 4/2005 | Hara et al. .................... 303/170 |
| 7,481,500 B2 * | 1/2009 | Miyazaki et al. ........... 303/122.1 |
| 7,722,133 B2 * | 5/2010 | Suzuki et al. .............. 303/119.2 |
| 7,988,243 B2 * | 8/2011 | Miyazaki et al. ............. 303/155 |
| 8,029,072 B2 * | 10/2011 | Miyazaki et al. .......... 303/113.4 |
| 8,244,430 B2 * | 8/2012 | Izumikawa et al. .......... 701/34.4 |
| 8,573,710 B2 * | 11/2013 | Yamamoto et al. ................ 303/5 |
| 8,672,419 B2 * | 3/2014 | Miyazaki et al. .......... 303/113.4 |
| 2001/0038243 A1 * | 11/2001 | Isono ........................ 303/116.1 |
| 2006/0066146 A1 | 3/2006 | Otomo |
| 2007/0194622 A1 | 8/2007 | Nakazawa et al. |
| 2008/0084107 A1 | 4/2008 | Yanai et al. |
| 2010/0259096 A1 | 10/2010 | Rieth et al. |
| 2013/0241275 A1 * | 9/2013 | Miyazaki et al. ............ 303/6.01 |
| 2013/0249274 A1 * | 9/2013 | Miyazaki et al. ............ 303/6.01 |

FOREIGN PATENT DOCUMENTS

| | | |
|---|---|---|
| JP | 11 227590 | 8/1999 |
| JP | 2001 225739 | 8/2001 |
| JP | 2006 123889 | 5/2006 |
| JP | 2006 306221 | 11/2006 |
| JP | 2007 216850 | 8/2007 |
| JP | 2009 502645 | 1/2009 |
| JP | 2009-502645 A | 1/2009 |
| WO | WO 9710133 | 3/1997 |

OTHER PUBLICATIONS

U.S. Appl. No. 13/582,827, filed Sep. 5, 2012, Isono.

Extended European Search Report issued in European Application No. 10845176.6 dated Sep. 10, 2014.

* cited by examiner

FIG.8

BRAKE SYSTEM

TECHNICAL FIELD

The present invention relates to a brake system having a hydraulic brake configured to restrain rotation of a wheel.

BACKGROUND ART

Patent Document 1 discloses a brake system having (a) a hydraulic brake configured to restrain rotation of a wheel, (b) a master cylinder, (c) an accumulator, (d) a pressure increasing mechanism utilizing hydraulic pressure of the accumulator and activatable by activation of an electric actuator, and (e) a selector valve configured to select a higher one of hydraulic pressure of the pressure increasing mechanism and hydraulic pressure of the master cylinder, and to supply the selected hydraulic pressure to a brake cylinder of the hydraulic brake.

When the electric actuator is normal, the pressure increasing mechanism is activated by the electric actuator. When the electric actuator is in failure, the pressure increasing mechanism is activated by the hydraulic pressure of the master cylinder. Further, when the working fluid of high pressure can be supplied from the accumulator, the pressure increasing mechanism can generate hydraulic pressure that is higher than the hydraulic pressure of the master cylinder. When the working fluid of the accumulator becomes low, the hydraulic pressure outputted by the pressure increasing mechanism becomes low, too.

Since the higher one of the hydraulic pressure of the pressure increasing mechanism and the hydraulic pressure of the master cylinder is selected by the selector valve so as to be supplied to the brake cylinder, the hydraulic pressure of the master cylinder is supplied to the brake cylinder when the hydraulic pressure of the accumulator is low, namely, when the hydraulic pressure outputted by the pressure increasing mechanism is low.

Patent Document 2 discloses a brake system having (a) hydraulic brakes provided for front right, front left, rear right and rear left wheels of a vehicle and configured to restrain rotations of the wheels, (b) a master cylinder, (c) a mechanical booster mechanism provided between the master cylinder and brakes cylinders of ones of the hydraulic brakes which are provided for the front right and front left wheels, (d) a high pressure source pressure of the high pressure source. In this brake system, when the high pressure source and the electromagnetic valve are normal, the hydraulic pressure of the high pressure source controlled by the electromagnetic valve is supplied to the brake cylinders provided for the front and rear wheels. When components such as the electromagnetic valve are in failure, the hydraulic pressure generated by the mechanical pressure increasing mechanism is supplied to the brake cylinders provided for the front wheel while the hydraulic pressure of the master cylinder is supplied to the brake cylinders provided for the rear wheels.

PRIOR ART DOCUMENTS

Patent Documents

[Patent Document 1] JP-2009-502645A
[Patent Document 2] JP-H10-287227A

DISCLOSURE OF THE INVENTION

Object to be Achieved by the Invention

An object of the present invention is to improve a brake system.

Measures for Achieving the Object and Effect

A brake system described in claim 1 includes: (a) a plurality of hydraulic brakes provided for respective wheels of a vehicle, and configured to be activated by hydraulic pressures of respective brake cylinders thereof so as to restrain rotations of the respective wheels; (b) a manual hydraulic pressure source which is configured to generate hydraulic pressure by operation of a brake operating member by an operator; (c) a power hydraulic pressure source which is configured to generate hydraulic pressure by supply of electric energy thereto; (d) a high pressure generator which is configured to generate hydraulic pressure that is higher than the hydraulic pressure of said manual hydraulic pressure source, by utilizing the hydraulic pressure of said power hydraulic pressure source; (e) a common passage to which a first brake cylinder, a second brake cylinder and said high pressure generator are connected, said first brake cylinder being one of said brake cylinders of said hydraulic brakes and being connected to said common passage via a first individual passage, said second brake cylinder being one of said brake cylinders that is other than said first brake cylinder and being connected to said common passage via a second individual passage that is other than said first individual passage; (f) a high-pressure-generator cut-off valve disposed between said common passage and said high pressure generator; (g) a first manual-pressure-source passage connecting said first individual passage and said manual hydraulic pressure source; (h) a first manual-pressure-source cut-off valve provided in said first manual-pressure-source passage; (i) a first valve provided in a portion of a pressure supply passage which is located between a connected portion of said pressure supply passage and said second brake cylinder, said pressure supply passage including said first individual passage, second individual passage and common passage, said pressure supply passage being connected at said connected portion thereof to said first manual-pressure-source passage; and (j) a pressure-supply control device configured to control supply of the hydraulic pressure to each of said first and second brake cylinders, by controlling at least said high-pressure-generator cut-off valve, first valve and first manual-pressure-source cut-off valve.

In the present brake system, for example, when the high-pressure-generator cut-off valve and the first valve are placed in open states, the hydraulic pressure of the high pressure generator can be supplied to the first and second brake cylinders. When the first manual-pressure-source cut-off valve is placed in a closed state with the high-pressure-generator cut-off valve and the first valve being placed in the open states, it is possible to prevent the hydraulic pressure of the first brake cylinder from flowing back to the manual hydraulic pressure source.

Further, when the first manual-pressure-source cut-off valve is placed in an open state with the high-pressure-generator cut-off valve and the first valve being placed in closed states, it is possible to allow the first brake cylinder to be in communication with the master cylinder while isolating the first brake cylinder from the high pressure generator and the second brake cylinder. Thus, the first and second brake cylinders are isolated from each other, so that, even in the event of fluid leakage occurring in one of a brake line including the first brake cylinder and another brake line including the second brake cylinder, it is possible to avoid the other of the brake lines from being influenced by the fluid leakage occurring in the one of the brake lines.

Thus, in the present brake system, by controlling the high-pressure-generator cut-off valve, first valve and first manual-pressure-source cut-off valve, the hydraulic pressure can be supplied to each of the brake cylinders in accordance with various modes.

The first valve may be disposed in a portion of the pressure supply passage which portion is located between the second brake cylinder and a high-pressure-generator connected portion of the pressure supply passage at which the pressure supply passage is connected to the high pressure generator, or alternatively, may be disposed in another portion of the pressure supply passage which portion is located between the first brake cylinder and the high-pressure-generator connected portion of the pressure supply passage (i.e., which is located between the high-pressure-generator connected portion of the pressure supply passage and the above-described connected portion of the pressure supply passage at which the pressure supply passage is connected to the first manual-pressure-source passage). Irrespective of whether the first valve is disposed in the above-described portion or another portion of the pressure supply passage, it is possible to selectively communicate and isolate the first and second brake cylinders to and from each other.

VARIOUS MODES OF THE INVENTION

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A brake system, characterized by comprising:
a plurality of hydraulic brakes provided for respective wheels of a vehicle, and configured to be activated by hydraulic pressures of respective brake cylinders thereof so as to restrain rotations of the respective wheels;
a manual hydraulic pressure source which is configured to generate hydraulic pressure by operation of a brake operating member by an operator;
a power hydraulic pressure source which is configured to generate hydraulic pressure by supply of electric energy thereto;
a high pressure generator which is configured to generate hydraulic pressure that is higher than the hydraulic pressure of said manual hydraulic pressure source, by utilizing the hydraulic pressure of said power hydraulic pressure source;
a common passage to which a first brake cylinder, a second brake cylinder and said high pressure generator are connected, said first brake cylinder being one of said brake cylinders of said hydraulic brakes and being connected to said common passage via a first individual passage, said second brake cylinder being one of said brake cylinders that is other than said first brake cylinder and being connected to said common passage via a second individual passage that is other than said first individual passage;
a high-pressure-generator cut-off valve disposed between said common passage and said high pressure generator;
a first manual-pressure-source passage connecting said first individual passage and said manual hydraulic pressure source;
a first manual-pressure-source cut-off valve provided in said first manual-pressure-source passage;
a first valve provided in a portion of a pressure supply passage which is located between a connected portion of said pressure supply passage and said second brake cylinder, said pressure supply passage including said first individual passage, second individual passage and common passage, said pressure supply passage being connected at said connected portion thereof to said first manual-pressure-source passage; and
a pressure-supply control device configured to control supply of the hydraulic pressure to each of said brake cylinders, by controlling at least said high-pressure-generator cut-off valve, first valve and first manual-pressure-source cut-off valve.

The high pressure generator, which is configured to generate hydraulic pressure that is higher than the hydraulic pressure of the manual hydraulic pressure source, may be activated either mechanically or by supply of electric energy thereto. Further, the high pressure generator may include at least one of components of the power hydraulic pressure source or may be constituted by a pressure increasing mechanism (such as boosting mechanism) configured to increase hydraulic pressure of a manual hydraulic pressure source that is other than the power hydraulic pressure source. The pressure increasing mechanism may be provided either integrally with the manual hydraulic pressure source or independently of the manual hydraulic pressure source.

Further, each of the high-pressure-generator cut-off valve, first valve and first manual-pressure-source cut-off valve may be either a normally-open electromagnetic valve that is to be placed in an open state when electric current is not being supplied to a solenoid thereof or a normally-closed electromagnetic valve that is to be placed in a closed state when electric current is not being supplied to the solenoid thereof.

The electromagnetic valve is a valve that is controllable to be placed in at least the open and closed states by controlling electric current supplied to the solenoid of the valve. The electromagnetic valve may be either a linear control valve or a simple on/off valve. In the linear control valve, a difference between the hydraulic pressure on one of opposite sides of the valve and the hydraulic pressure on the other of the opposite sides of the valve or/and an opening angle of the valve are continuously controllable by continuously controlling the electric current supplied to the solenoid of the valve. In the simple on/off valve, the open and closed states can be selectively established by selectively turning ON/OFF the supply of the electric current to the solenoid of the valve. Hereinafter, in the description of the present application, the term "electromagnetic valve" may be interpreted as either a linear control valve or a simple on/off valve, unless otherwise specified.

(2) The brake system according to mode (1), wherein said pressure-supply control device includes an electromagnetic-valve controlling portion configured to control said high-pressure-generator cut-off valve, first valve and first manual-pressure-source cut-off valve, so as to establish a first state and a second state, such that the hydraulic pressure of said high pressure generator is supplied to said first brake cylinder and second brake cylinder by placing said high-pressure-generator cut-off valve and first valve first valve in open states and placing said first manual-pressure-source cut-off valve in a closed state when said first state is established, and such that the hydraulic pressure of said manual hydraulic pressure source is supplied to said first brake cylinder with said first brake cylinder being isolated from said high pressure generator and said second brake cylinder by placing said high-pressure-generator cut-off valve and first valve in closed states and placing said first manual-pressure-source cut-off valve in an open state.

(3) The brake system according to mode (1) or (2), wherein each of said high-pressure-generator cut-off valve and said first valve is constituted by a normally-open electromagnetic valve that is to be placed in an open state when electric current is not being supplied to a solenoid thereof.

For example, (a) where the higher pressure generator is capable of generating the hydraulic pressure higher than the hydraulic pressure of the manual hydraulic pressure source even without supply of electric energy thereto, or (b) where the high pressure generator is capable of generating the hydraulic pressure higher than the hydraulic pressure of the manual hydraulic pressure source owing to electric energy that can be supplied thereto from an auxiliary electric line in case of failure of a control system or failure of a main electric line, it is possible to supply the hydraulic pressure higher than the hydraulic pressure of the manual hydraulic pressure source, to both of the first and second brake cylinders in the case of the failure of the main electric line when the above-described first state is being established.

The brake system disclosed in Patent Document 2 is different from the brake system described in this mode, because valves (electromagnetic valves 80-88) each corresponding to the first valve is a normally-closed electromagnetic valve in the brake system of Patent Document 2.

(4) The brake system according to any one of modes (1)-(3), wherein said first manual-pressure-source cut-off valve is constituted by a normally-closed electromagnetic valve that is to be placed in a closed state when electric current is not being supplied to a solenoid thereof.

For example, where the hydraulic pressure of the high pressure generator is supplied to the first and second brake cylinders in case of failure of the electric system, it is possible to prevent the working fluid from flowing back to the manual hydraulic pressure source from the first and second brake cylinders, since the first manual-pressure-source cut-off valve is placed in the closed state.

The brake system disclosed in Patent Document 2 is different from the brake system described in this mode, because master-cylinder cut-off valves (valves 30, 40, 46, 56) each corresponding to the manual-pressure-source cut-off valve is a normally-open electromagnetic valve in the brake system of Patent Document 2.

(5) The brake system according to any one of modes (1)-(4), comprising first and second manual hydraulic pressure sources and a second manual-pressure-source cut-off valve, wherein said first valve is provided in a portion of said pressure supply passage which is located between a high-pressure-generator connected portion of said pressure supply passage and said second brake cylinder, said pressure supply passage being connected at said high-pressure-generator connected portion thereof to said high pressure generator, wherein said first manual hydraulic pressure source is connected to said first brake cylinder via said first manual-pressure-source passage, while said second manual hydraulic pressure source is connected to said second brake cylinder via a second manual-pressure-source passage that is other than said first manual-pressure-source passage, and wherein said second manual-pressure-source cut-off valve is provided in said second manual-pressure-source passage.

The first and second manual hydraulic pressure sources may be constituted by, for example, two pressurizing chambers (i.e., first and second pressurizing chambers) of a tandem master cylinder.

For example, by placing the first valve and the high-pressure-generator cut-off valve in the closed states while placing the first and second manual-pressure-source cut-off valves in the open states, it is possible to supply the hydraulic pressures of the manual hydraulic pressure sources to the first and second brake cylinders with the first and second brake cylinders being isolated from each other.

Further, by placing the first valve and the high-pressure-generator cut-off valve in the open states while placing the first and second manual-pressure-source cut-off valves in the closed states, it is possible to supply the hydraulic pressure of the high pressure generator to the first and second brake cylinders with the first and second brake cylinders being isolated from the manual hydraulic pressure sources.

The second manual-pressure-source passage is connected to a portion of the pressure supply passage which portion is located between the first valve and the second brake cylinder, without via the common passage.

(6) The brake system according to mode (5), wherein said second manual-pressure-source cut-off valve is constituted by a normally-open electromagnetic valve that is to be placed in an open state when electric current is not being supplied to a solenoid thereof.

Even in event of failure of the electric system, the hydraulic pressure of the manual hydraulic pressure source can be reliably supplied to the second brake cylinder.

For example, where the high pressure generator is constituted by a pressure increasing mechanism that is to be activated by the hydraulic pressure of the first pressurizing chamber of the master cylinder so as to increase the hydraulic pressure of the first pressurizing chamber, the hydraulic pressure of the pressure increasing mechanism is supplied to the first and second brake cylinders and also to the second pressurizing chamber of the master cylinder whereby the hydraulic pressure outputted from the first pressurizing chamber is increased, when the first manual-pressure-source cut-off valve is placed in the closed state while the first valve and the second manual-pressure-source cut-off valve are placed in the open states. Consequently, the hydraulic pressure supplied to the pressure increasing mechanism is increased and accordingly the hydraulic pressure outputted from the pressure increasing mechanism is also increased whereby the hydraulic pressure supplied to the first and second brake cylinders is also increased.

Further, when the pressure increasing mechanism becomes unable of increasing the hydraulic pressure of the first pressurizing chamber, the hydraulic pressure is supplied to the first brake cylinder from the first pressurizing chamber via the pressure increasing mechanism while the hydraulic pressure is supplied to the second brake cylinder from the second pressurizing chamber. Thus, to each of the first and second brake cylinders, the hydraulic pressure can be supplied from a corresponding one of pressurizing chambers of the master cylinder which are other than each other.

(7) The brake system according to any one of modes (1)-(4), comprising first and second manual hydraulic pressure sources, wherein said first manual hydraulic pressure source is connected to said first brake cylinder via said first manual-pressure-source passage, wherein said second manual hydraulic pressure source is, connected to said second brake cylinder via a second manual-pressure-source passage that is other than said first manual-pressure-source passage, wherein said first valve is provided in a portion of said pressure supply passage which is located between said connected portion of said pressure supply passage and a high-pressure-generator connected portion of said pressure supply passage, said pressure supply passage being connected at said high-pressure-generator connected portion thereof to said high pressure generator, said brake system comprising:

a second manual-pressure-source cut-off valve provided in said second manual-pressure-source passage; and a second valve provided in a portion of said pressure supply passage which is located between said high-pressure-generator connected portion of said pressure supply passage and a second-manual-pressure-source-passage connected portion of said pressure supply passage, said pressure supply passage being connected at said second-manual-pressure-source-passage connected portion thereof to said second manual-pressure-source passage.

Each of the first and second brake cylinders is provided with a corresponding one of the first and second valves and a corresponding one of the first and second manual-pressure-source cut-off valves, so that it is possible to supply the hydraulic pressure to each of the first and second brake cylinders from the high pressure generator or the corresponding manual hydraulic pressure, by controlling the first and second valves and the first and second manual-pressure-source cut-off valves.

Further, it is possible to selectively communicate and isolate the first and second brake cylinders to and from each other.

Moreover, since the hydraulic pressures are supplied to the first and second brake cylinders from the respective manual hydraulic pressure sources that are other than each other, the hydraulic pressures of the manual hydraulic pressure sources can be reliably supplied to the manual hydraulic pressure sources.

It is noted that the first and second brake cylinders may be brake cylinders of hydraulic brakes provided for front left and right wheels of the vehicle.

(8) The brake system according to mode (7), wherein said second valve is constituted by a normally-closed electromagnetic valve that is to be placed in a closed state when electric current is not being supplied to a solenoid thereof, and wherein said second manual-pressure-source cut-off valve is constituted by a normally-open electromagnetic valve that is to be placed in an open state when electric current is not being supplied to a solenoid thereof.

In event of failure of the electric system, the hydraulic pressure can be supplied to the second brake cylinder from the second manual hydraulic pressure source, with the second brake cylinder being isolated from the first brake cylinder and the high pressure generator.

The first and second valves can be provided in respective individual passages that are connected to the respective first and second brake cylinders, so that the first and second valves serve as pressure-increasing control valves capable of controlling the hydraulic pressures in the respective first and second brake cylinders.

(9) The brake system according to mode (7) or (8), wherein said hydraulic brakes are provided for respective front right, front left, rear right and rear left wheels of the vehicle that constitute two pairs of wheels, each pair of the two pairs of wheels being constituted by two of the wheels located in respective positions that are diagonal to each other, wherein said brake cylinders of said hydraulic brakes are connected to said common passage via respective individual passages, wherein each of two of said individual passages, which are connected to respective two of said brake cylinders provided for respective two of the wheels that constitute one pair of the two pairs of wheels, is provided with a pressure-increasing control valve constituted by a normally-open electromagnetic valve that is to be placed in an open state when electric current is not being supplied to a solenoid thereof, and wherein each of two of said individual passages, which are connected to respective two of said brake cylinders provided for respective two of the wheels that constitute another one pair of the two pairs of wheels, is provided with a pressure-increasing control valve constituted by a normally-closed electromagnetic valve that is to be placed in a closed state when electric current is not being supplied to a solenoid thereof.

When the electric current is not supplied to the solenoid of any one of the electromagnetic valves, the two brake cylinders provided for respective two of the wheels that constitute the above-described one pair of wheels are in communication with the common passage, while the two brake cylinders provided for respective two of the wheels that constitute the above-described another one pair of wheels are isolated from the common passage. Therefore, the hydraulic pressure of the high pressure generator is supplied to the two brake cylinders which are held in communication with the common passage and which are provided for the respective wheels located in respective positions that are diagonal to each other, thereby making it possible to restrain generation of a yaw moment.

Further, when the working fluid cannot be supplied at a high rate from the high pressure generator, it is preferable that the working fluid is supplied to two brake cylinders, namely, it is preferable that the working fluid is not supplied to three or more brake cylinders.

Moreover, it is common that a pressure receiving area of a piston of the brake cylinder for the front wheel is larger than a pressure receiving area of a piston of the brake cylinder for the rear wheel. Therefore, when the hydraulic pressure in the front-wheel brake cylinder and the hydraulic pressure in the rear-wheel brake cylinder are to be equalized to each other, the working fluid is consumed more in the front-wheel brake cylinder than in the rear-wheel brake cylinder. In view of this, there is an advantage that a relatively small amount of the working fluid is required in the arrangement in which the hydraulic pressure of the high pressure generator is supplied to a brake cylinder provided for one of front wheels and a brake cylinder provided for one of rear wheels, as compared with an arrangement in which the hydraulic pressure of the high pressure generator is supplied to brake cylinders provided for front right and left wheels.

It can be considered that the normally-open pressure-increasing control valve provided for one of the front right and left wheels corresponds to the first valve and that the normally-closed pressure-increasing control valve provided for another one of the front right and left wheels corresponds to the second valve.

(10) The brake system according to mode (9), comprising:
a low pressure source; and
a pressure-reducing control valve disposed between said low pressure source and one of said brake cylinders that is provided for the rear right wheel or rear left wheel,
wherein said one of said brake cylinders is connected to one of said individual passages which is provided with said pressure-increasing control valve constituted by said normally-closed electromagnetic valve,
and wherein said pressure-reducing control valve is constituted by a normally-open electromagnetic valve that is to be placed in an open state when electric current is not being supplied to a solenoid thereof.

Even in the arrangement in which the pressure-increasing control valve is constituted by a normally-closed electromagnetic valve, it is possible to prevent brake dragging upon release of a brake operation, because the brake cylinder is in communication with the low pressure source.

(11) The brake system according to mode (9), comprising a check valve disposed in parallel with said pressure-increasing control valve that is constituted by said normally-closed electromagnetic valve,
wherein said check valve is configured to allow flow of a working fluid in a direction toward said common passage away from one of said brake cylinders that is connected to said pressure-increasing control valve constituted by said normally-closed electromagnetic valve, and to inhibit flow of the working fluid in a direction opposite to said direction toward said common passage away from said one of said brake cylinders that is connected to said pressure-increasing control valve constituted by said normally-closed electromagnetic valve.

Since the pressure-increasing control valve is constituted by the normally-closed electromagnetic valve, there is a risk of brake dragging if the working fluid remains in the brake cylinder upon release of a brake operation. However, the disposition of the above-described check valve in parallel with the pressure-increasing control valve enables the working fluid to flow back to the common passage upon release of the brake operation. For example, when the high pressure generator is in communication with the manual hydraulic pressure source, the working fluid having flowed back to the common passage can be returned to the manual hydraulic pressure source via the high pressure generator, whereby brake dragging can be prevented. Thus, where the check valve is provided in parallel with the normally-close pressure-increasing control valve, the pressure-reducing control valve can be constituted by the normally-closed electromagnetic valve, thereby making it possible to reduce consumption of the electric power.

(12) The brake system according to any one of modes (1)-(8),
wherein said hydraulic brakes are provided for respective front right, front left, rear right and rear left wheels of the vehicle,
and wherein said brake cylinders of ones of said hydraulic brakes which are provided for the rear right and left wheels are connected to said common passage via a third individual passage,
said brake system comprising a third valve which is provided in said third individual passage and which is constituted by a normally-closed electromagnetic valve that is to be placed in a closed state when electric current is not being supplied to a solenoid thereof.

A large braking force can be caused to more effectively act on an entirety of the vehicle, by supplying the hydraulic pressure to the front-wheel brake cylinder to increase the hydraulic pressure in the front-wheel brake cylinder to a certain level, rather than by supplying the hydraulic pressure to the rear-wheel brake cylinder to increase the hydraulic pressure in the rear-wheel brake cylinder to the same certain level.

In view of this, it is preferable that the working fluid is not supplied to the rear-wheel brake cylinder when the high pressure generator cannot supply the working fluid at a high rate, namely, when there is a limitation on a rate of supply of the working fluid from the high pressure generator.

In the brake system described in this mode, the brake cylinders provided for the rear right and left wheels are connected to the common passage via the third individual passage, so that the hydraulic pressures in the brake cylinders provided for the rear right and left wheels can be commonly controlled.

It is noted that the brake cylinders provided for the rear right and left wheels can be connected to the common passage via respective individual passages so that the hydraulic pressures in the respective brake cylinders can be controlled independently of each other.

(13) The brake system according to mode (12), comprising a rear-wheel-brake-cylinder-side check valve which is provided in parallel with said third valve,
wherein said rear-wheel-brake-cylinder-side check valve is configured to allow flow of a working fluid in a direction toward said common passage away from said brake cylinders of said ones of said hydraulic brakes which are provided for the rear right and left wheels, and to inhibit flow of the working fluid in a direction opposite to said direction toward said common passage away from said ones of said brake cylinders.

(14) The brake system according to any one of modes (1)-(13),
wherein said power hydraulic pressure source is connected to said common passage via a passage bypassing said high pressure generator,
said brake system comprising an output hydraulic pressure control device configured to control the hydraulic pressure outputted by said power hydraulic pressure source.

The output hydraulic pressure control device may be configured to control the hydraulic pressure outputted by the power hydraulic pressure source, by either controlling the power hydraulic pressure source or controlling at least one electromagnetic valve that is provided for the power hydraulic pressure source. In either arrangement, the hydraulic pressure supplied from the power hydraulic pressure source to the common passage is controlled by the output hydraulic pressure control device.

Where the power hydraulic pressure source includes a pump device, it is possible to control the hydraulic pressure discharged from a pump, by controlling a pump motor. Where at least one electromagnetic valve is disposed between the power hydraulic pressure source and the common passage, it is possible to control the hydraulic pressure supplied to the common passage, by controlling the at least one electromagnetic valve.

In the brake system described in this mode, the plurality of brake cylinders as well as the power hydraulic pressure source and the high pressure generator are connected to the common passage. It is possible to supply the hydraulic pressure to the plurality of brake cylinders from either one of the power hydraulic pressure source and the high pressure generator. Further, it is possible to supply the hydraulic pressure from the power hydraulic pressure source to at least one of the plurality of brake cylinders, and to supply the hydraulic pressure from the high pressure generator and/or the manual hydraulic pressure source to the other of the plurality of brake cylinders.

(15) The brake system according to any one of modes (1)-(14), wherein said high pressure generator is disposed among said common passage, said power hydraulic pressure source and said manual hydraulic pressure source, and wherein said high pressure generator is to be activated mechanically by the hydraulic pressure of said manual hydraulic pressure source.

In the brake system described in this mode, the high pressure generator is provided as a component that is other than the power hydraulic pressure source, and is to be activated mechanically. Therefore, even in event of failure of the electric system, for example, it is possible to generate the hydraulic pressure higher than the hydraulic pressure of the manual hydraulic pressure source.

(16) The brake system according to mode (15), wherein said high pressure generator includes (a) a mechanical pressure-increasing device configured to increase the hydraulic pressure of said manual hydraulic pressure source and to output the increased hydraulic pressure and (b) a high-pressure-side check valve disposed between said mechanical pressure-increasing device and said power hydraulic pressure source, and wherein said high-pressure-side check valve is configured to allow flow of a working fluid in a direction toward said mechanical pressure-increasing device away from said power hydraulic pressure source, and to inhibit flow of the working fluid in a direction opposite to said direction toward said mechanical pressure-increasing device away from said power hydraulic pressure source.

In the brake system described in this mode, the high pressure generator is provided as a component that is other than the power hydraulic pressure source, and is to be activated mechanically. Therefore, even in event of failure of the electric system, for example, it is possible to generate the hydraulic pressure higher than the hydraulic pressure of the manual hydraulic pressure source.

Further, since the high-pressure-side check valve is disposed between the power hydraulic pressure source and the mechanical pressure-increasing device, the flow of the working fluid between the power hydraulic pressure source and the mechanical pressure-increasing device is inhibited when the hydraulic pressure of the power hydraulic pressure source is not higher than the hydraulic pressure of the mechanical pressure-increasing device. It is therefore possible to satisfactorily avoid reduction of the hydraulic pressure outputted by the mechanical pressure-increasing device.

In the brake system disclosed in Patent Document 1, the high-pressure-side check valve is not provided in the pressure increasing mechanism, so that there is a case in which the hydraulic pressure outputted by the pressure increasing mechanism becomes lower than the hydraulic pressure of the master cylinder when the hydraulic pressure of the working fluid stored in the accumulator is low. Further, owing to the selector valves 27, 28, a higher one of the hydraulic pressure of the master cylinder and the hydraulic pressure of the pressure increasing mechanism is supplied to the brake cylinders. Thus, in the brake system disclosed in Patent Document 1, the selector valves 27, 28 are provided so as not to supply a hydraulic pressure lower than the hydraulic pressure of the master cylinder, to the brake cylinders.

On the other hand, in the brake system described in this mode, owing to the high-pressure-side check valve, it is possible to avoid the hydraulic pressure outputted by the mechanical pressure-increasing device, from becoming lower than the hydraulic pressure of the manual hydraulic pressure source. Thus, the provision of the high-pressure-side check valve eliminates necessity of provision of valves serving as the selector valves 27, 28, thereby making it possible to reduce the number of required components and to accordingly reduce the cost.

(17) The brake system according to mode (16), wherein said mechanical pressure-increasing device includes (a) a housing, (b) a stepped piston which is fluid-tightly and slidably fitted in said housing and which has a large diameter portion and a small diameter portion, (c) a large diameter chamber which is located on a side of said large diameter portion of said stepped piston and which is connected to said manual hydraulic pressure source, (d) a small diameter chamber which is located on a side of said small diameter portion of said stepped piston and which is connected to said brake cylinders, (e) a high pressure chamber to which said power hydraulic pressure source is connected, and (f) a high-pressure supply valve which is disposed between said high pressure chamber and said small diameter chamber and which is to be switched from a closed state to an open state by forward movement of said stepped piston.

Since the mechanical pressure-increasing device includes the stepped piston, the hydraulic pressure of the manual hydraulic pressure source can be increased based on, for example, a ratio between a pressure receiving area of the large diameter portion and a pressure receiving area of the small diameter portion. In this sense, the mechanical pressure-increasing device may be referred to as a boosting mechanism, and the hydraulic pressure supplied from the mechanical pressure-increasing device may be referred to as a servo pressure. Further, the high pressure generator may be referred to as a pressure increasing mechanism.

(18) The brake system according to mode (17), wherein said high-pressure-side check valve is disposed between said high pressure chamber and said power hydraulic pressure source, and wherein said high-pressure-side check valve is configured to allow flow of a working fluid in a direction toward said high pressure chamber away from said power hydraulic pressure source, and to inhibit flow of the working fluid in a direction opposite to said direction toward said high pressure chamber away from said power hydraulic pressure source.

Further, since the high-pressure-side check valve is disposed between the high pressure chamber and the power hydraulic pressure source, the flow of the working fluid between the power hydraulic pressure source and the high pressure chamber is inhibited when the hydraulic pressure of the power hydraulic pressure source is not higher than the hydraulic pressure of the high pressure chamber. It is therefore possible to satisfactorily prevent the hydraulic pressure of the small diameter chamber from becoming lower than the hydraulic pressure of the large diameter chamber.

(19) The brake system according to mode (17) or (18),
wherein said high pressure generator includes a manual-side check valve disposed between said manual hydraulic pressure source and an output side portion of said mechanical pressure-increasing device,
and wherein said manual-side check valve is configured to allow flow of the working fluid in a direction toward said mechanical pressure-increasing device away from said manual hydraulic pressure source, and to inhibit flow of the working fluid in a direction opposite to said direction toward said mechanical pressure-increasing device away from said manual hydraulic pressure source.

Owing to the manual-side check valve, the hydraulic pressure outputted by the mechanical pressure-increasing device is prevented from flowing back to the manual hydraulic pressure source.

Further, in a case in which the hydraulic pressure of the small diameter chamber cannot be increased more due to inhibition of forward movement of the stepped piston of the mechanical pressure-increasing device (e.g., due to sticking of the piston, due to inhibition of further forward movement of the piston upon contact of the piston with a stopper that limits the forward movement of the piston, due to inhibition of forward movement of the piston by inhibition of flow of the working fluid between the power hydraulic pressure source and the mechanical pressure-increasing device by the high-pressure-side check valve), when the hydraulic pressure of the manual hydraulic pressure source becomes higher than the hydraulic pressure of the mechanical pressure-increasing device, the hydraulic pressure of the manual hydraulic pressure source is supplied to the common passage via the manual-side check valve. In this instance, the hydraulic pressure of the manual hydraulic pressure source is supplied to the common passage, without the hydraulic pressure being increased.

The output side portion of the mechanical pressure-increasing device includes the small diameter chamber, because the hydraulic pressure of the small diameter chamber is equal to the hydraulic pressure outputted by the mechanical pressure-increasing device.

It is noted that the manual-side check valve may be disposed inside the housing of the mechanical pressure-increasing device, or may be disposed in a midway of a pressure-increasing-device-bypass passage which is provided to bypass the housing of the mechanical pressure-increasing device and which interconnect the output side portion of the mechanical pressure-increasing device and the manual hydraulic pressure source.

(20) The brake system according to any one of modes (16)-(19), wherein said mechanical pressure-increasing device includes a communication passage via which said small diameter chamber and said large diameter chamber are to be in communication with each other when said stepped piston is being positioned in a reverse end position.

When the small diameter chamber and the large diameter chamber are in communication with each other with the stepped piston being positioned in the reverse end position, the hydraulic pressure of the common passage, i.e., the hydraulic pressure of each brake cylinder can be returned to the manual hydraulic pressure source via the mechanical pressure-increasing device upon release of a brake operation.

(21) A brake system, characterized by comprising:
a plurality of hydraulic brakes provided for respective wheels of a vehicle, and configured to be activated by hydraulic pressures of respective brake cylinders thereof so as to restrain rotations of the respective wheels;
a manual hydraulic pressure source which is configured to generate hydraulic pressure by operation of a brake operating member by an operator;
a power hydraulic pressure source which is configured to generate hydraulic pressure by supply of electric energy thereto;
a high pressure generator which is configured to generate hydraulic pressure that is higher than the hydraulic pressure of said manual hydraulic pressure source, by utilizing the hydraulic pressure of said power hydraulic pressure source;
a common passage to which a first brake cylinder, a second brake cylinder and said high pressure generator are connected, said first brake cylinder being one of said brake cylinders of said hydraulic brakes and being connected to said common passage via a first individual passage, said second brake cylinder being one of said brake cylinders that is other than said first brake cylinder and being connected to said common passage via a second individual passage that is other than said first individual passage;
a first manual-pressure-source passage connecting said first individual passage and said manual hydraulic pressure source;
a first manual-pressure-source cut-off valve provided in said first manual-pressure-source passage;
a first valve provided in a portion of a pressure supply passage which is located between a connected portion of said pressure supply passage and a connected portion of said common passage, said pressure supply passage including said first individual passage, second individual passage and common passage, said pressure supply passage being connected at said connected portion thereof to said first manual-pressure-source passage, said common passage being connected at said connected portion thereof to said high pressure generator; and
a pressure-supply control device configured to control supply of the hydraulic pressure to each of said brake cylinders, by controlling at least said first valve and first manual-pressure-source cut-off valve.

By placing the first valve in the open state and placing the first manual-pressure-source cut-off valve in the closed state, the first brake cylinder can be isolated from the master cylinder and brought into communication with the high pressure generator. It is therefore possible to supply the hydraulic pressure of the high pressure generator to the first and second brake cylinders.

Further, by placing the first valve in the closed state and placing the first manual-pressure-source cut-off valve in the open state, the first brake cylinder can be isolated from the high pressure generator and the second brake cylinder and brought into communication with the manual hydraulic pressure source, so that the hydraulic pressure of the high pressure generator is supplied to the second brake cylinder.

The technical features described in any one of the above modes (1)-(20) can be employed in the brake system described in this mode.

(22) A brake system, characterized by comprising:
a plurality of hydraulic brakes provided for respective wheels of a vehicle, and configured to be activated by hydraulic pressures of respective brake cylinders thereof so as to restrain rotations of the respective wheels;
a manual hydraulic pressure source which is configured to generate hydraulic pressure by operation of a brake operating member by an operator;
a power hydraulic pressure source which is configured to generate hydraulic pressure by supply of electric energy thereto;
a pressure increasing mechanism which is disposed among said power hydraulic pressure source, said manual hydraulic pressure source and said hydraulic brakes, and which is to be activated mechanically by the hydraulic pressure of said manual hydraulic pressure source so as to output the hydraulic pressure that is to be supplied to said brake cylinders of said hydraulic brakes, said brake system being characterized in that:

said pressure increasing mechanism includes (a) a mechanical pressure-increasing device configured to increase the hydraulic pressure of said manual hydraulic pressure source and to output the increased hydraulic pressure and (b) a high-pressure-side check valve disposed between said mechanical pressure-increasing device and said power hydraulic pressure source; and said high-pressure-side check valve is configured to allow flow of a working fluid in a direction toward said mechanical pressure-increasing device away from said power hydraulic pressure source, and to inhibit flow of the working fluid in a direction opposite to said direction toward said mechanical pressure-increasing device away from said power hydraulic pressure source.

The pressure increasing mechanism described in this mode is an example of the high pressure generator. The technical features described in any one of the above modes (1)-(21) can be employed in the brake system described in this mode.

(23) The brake system according to any one of modes (1)-(22), comprising:

a fluid-leakage possibility detecting device configured to detect presence of possibility of fluid leakage in said brake system; and an electromagnetic-valve controlling portion configured to place at least said first valve in the closed state when the presence of possibility of fluid leakage is detected by said fluid-leakage possibility detecting device.

(24) The brake system according to mode (23), wherein said fluid-leakage possibility detecting device is configured to detect the presence of possibility of fluid leakage, upon satisfaction of at least one of conditions that consist of (a) a condition that the hydraulic pressure in said common passage is lower than a common-passage-pressure-based judgment threshold value, (b) a condition that the hydraulic pressure in a brake line including said first brake cylinder and/or the hydraulic pressure in a brake line including said second brake cylinder is lower than a brake-line-pressure-based judgment threshold value, (c) a condition that an amount of a working fluid reserved in a reservoir reserving the working fluid used in said brake cylinders of said hydraulic brakes, is smaller than a reserved-fluid-amount-based judgment threshold value, and (d) a condition that the hydraulic pressure of said power hydraulic pressure source is lower than a fluid-source-pressure-based judgment threshold value.

Since the fluid-leakage possibility detecting device is configured to detect the presence of possibility of fluid leakage, there is a case in which the fluid leakage does not actually occur even when the presence of possibility of fluid leakage is detected by the fluid-leakage possibility detecting device. Further, there is a case in which an amount of fluid leakage is actually very little when the presence of possibility of fluid leakage is detected. Moreover, it is common that it is not possible to specify which part of the brake system suffers from the fluid leakage. In either of these cases, by placing a communication shut-off valve in a closed state upon detection of the presence of possibility of fluid leakage, it is possible to avoid the fluid leakage occurring in one of the brake cylinders (or one of the brake lines) from influencing the other of the brake cylinders (or the other of the brake lines), and accordingly to improve reliability of the brake system.

It is possible to regard that the possibility of fluid leakage is present in a case in which the hydraulic pressure in the common passage is not increased at all or not sufficiently increased (namely, remains lower than the common-passage-pressure-based judgment threshold value in spite of elapse of a given length of time after initiation of activation of the hydraulic pressure source) when the hydraulic pressure source has been activated at least for a given length of time with the hydraulic pressure source being in communication with the common passage.

Further, it is possible to regard that the possibility of fluid leakage is present also in a case in which the hydraulic pressure in the brake line including the first brake cylinder or/and the hydraulic pressure in the brake line including the second brake cylinder is lower than the brake-line-pressure-based judgment threshold value upon request of activations of the hydraulic brakes (i.e., upon operation of a brake operating member, or upon request of activation of an automatic brake). The brake-line-pressure-based judgment threshold value may be a value determined depending upon a required braking-force magnitude (i.e., a value dependent on a state of operation of the brake operating member or a value dependent on a required automatic-braking-force magnitude), or may be a considerably small value that is close to zero.

The detection of the presence of possibility of fluid leakage on the basis of an amount of the working fluid reserved in the reservoir can be made irrespective of states of activations of the hydraulic brakes or a state of operation of the brake operating member. It is possible to regard that the possibility of presence of fluid leakage is present, for example, in a case in which the hydraulic pressure is not sufficiently increased even when the hydraulic pressure source has been activated for a given length of time.

BRIEF DESCRIPTION OF DRAWINGS

FIG. 8 is a view showing still another state upon execution of the hydraulic-pressure-supply control program in the hydraulic brake system (in case of presence of possibility of fluid leakage).

MODES FOR CARRYING OUT THE INVENTION

Figure 1:
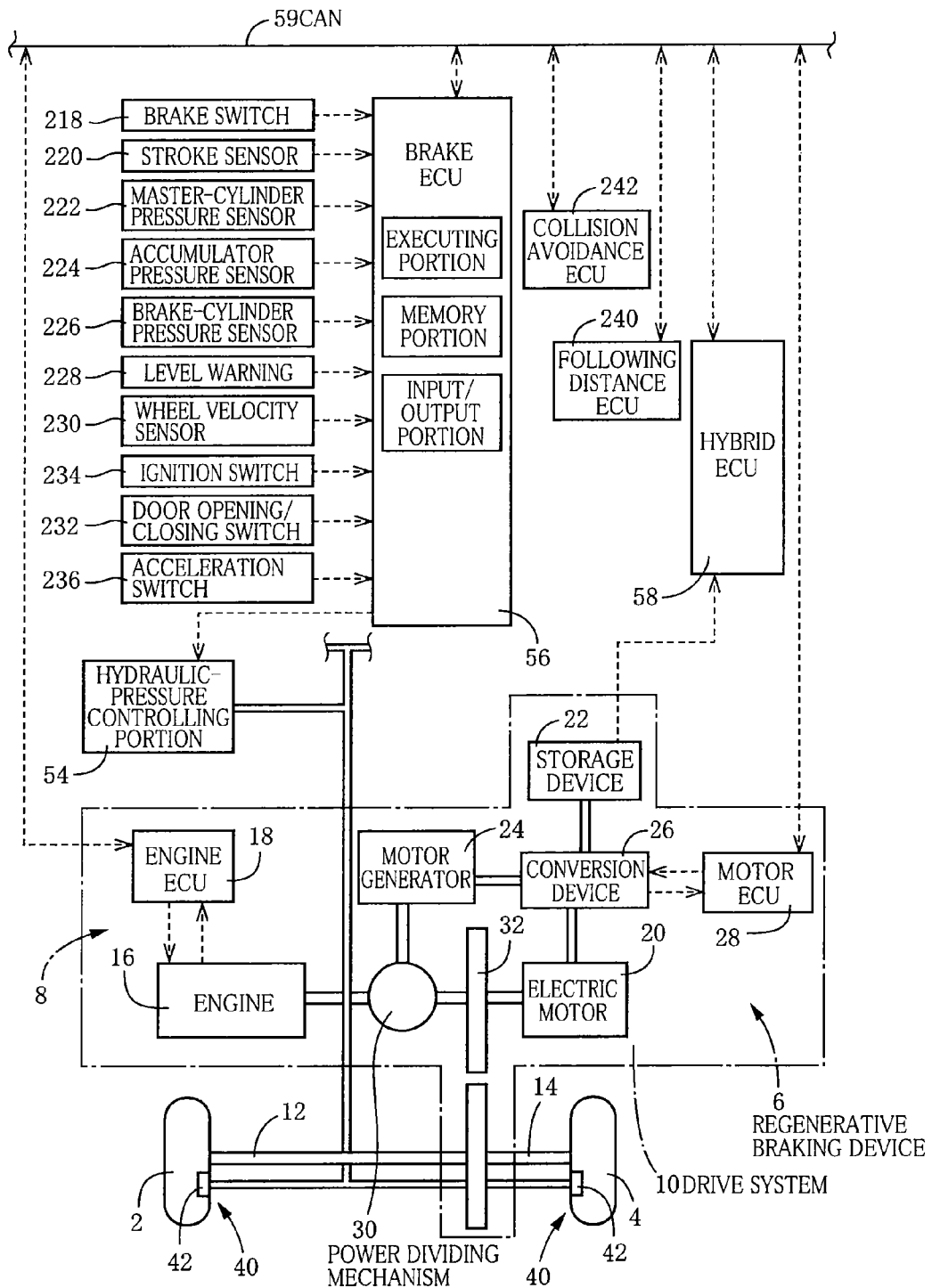
FIG. 1 is a view schematically showing an entirety of a vehicle in which a hydraulic brake system that is common to embodiments of the present invention is installed.

Hereinafter, a brake system as an embodiment of the present invention will be described with reference to drawings.

There will be first described a vehicle on which a hydraulic brake system as the brake system according to the embodiment 1 is installed.

This vehicle is a hybrid vehicle including driving units in the form of an electric motor and an engine, so that front left and right wheels 2, 4 as drive wheels are to be driven by a drive system 10 including an electric drive device 6 and an internal-combustion drive device 8. A drive power of the drive system 10 can be transmitted to the front left and right wheels 2, 4 via drive shafts 12, 14. The internal-combustion drive device 8 includes an engine 16 and an engine ECU 18 that is configured to control activation of the engine 16. The electric drive device 6 includes a driving electric motor 20, a storage device 22, a motor generator 24, a conversion device 26, a motor ECU 28 and a power dividing mechanism 30. The electric motor 20, motor generator 24, engine 16 and power dividing mechanism 30 (to which the electric motor 20, motor generator 24 and engine 16 are connected) are controlled so as to selectively establish a state in which only a driving torque of the electric motor 20 is transmitted to an output member 32, a state in which a driving torque of the engine 16 and the driving torque of the electric motor 20 are both transmitted to the output member 32, and a state in which an output of the engine 16 is outputted to the motor generator 24 and the output member 32. The driving force transmitted to the output member 32 is transmitted to the drive shafts 12, 14 via a speed reducer and differential gears.

The conversion device 26 includes an inverter, and is controlled by the motor ECU 28. With electric current control of the inverter, the conversion device 26 selectively establishes at least a driving state in which the electric motor 20 is rotated by electric energy supplied from the storage device 22 to the electric motor 20 and a charging state in which the conversion device 26 serves as a generator upon regenerative braking so as to charge the storage device 22 with electric energy. During the charging state, a regenerative braking torque is applied to each of the front left and right wheels 2, 4. In this sense, the electric drive device 6 can be considered as a regenerative braking device.

The hydraulic brake system includes brake cylinders 42 of respective hydraulic brakes 40 provided for the respective front left and right wheels 2, 4, brake cylinders 52 of respective hydraulic brakes 50 provided for the respective rear left and right wheels 46, 48 (see FIGS. 2, 9 and 18), and a hydraulic-pressure controlling portion 54 configured to control hydraulic pressures of the respective brake cylinders 42, 52. The hydraulic-pressure controlling portion 54 is to be controlled by a brake ECU 56 that is constituted principally by a computer.

Further, the vehicle is provided with a hybrid ECU 58. The hybrid ECU 58, brake ECU 56, engine ECU 18 and motor ECU 28 are connected to one another via CAN (car area network) 59, so that these ECUs 58, 56, 18, 28 are communicable to one another, and required information are transmitted among the ECUs 58, 56, 18, 28 as needed.

The present hydraulic brake system is installable on not only a hybrid vehicle but also a plug-in hybrid vehicle, an electric vehicle and a fuel battery vehicle. In an electric vehicle, the internal-combustion drive device 8 is not required. In a fuel battery vehicle, the driving motor is driven by, for example, a fuel battery stack.

Further, the present hydraulic brake system is installable also on an internal-combustion drive vehicle. In such a vehicle not equipped with the electric drive device 6, a regenerative braking torque is not applied to the driving wheels 2, 4 so that a regenerative cooperative control is not executed.

The hydraulic brake system will be next described. In the following description, each of the brake cylinders, hydraulic brakes and electromagnetic valves will be referred together with, as a suffix, one of reference signs (FR, FL, RR, RL) indicative of the respective front right, front left, rear right and rear left wheels, where it should be clarified which one of the four wheels the referred brake cylinder, hydraulic brake or electromagnetic valve corresponds to. However, each of the brake cylinders, hydraulic brakes and electromagnetic valves will be referred without such reference signs, where it is referred to as a representative of those provided for the four wheels, or where the above-described clarification is not required.

Embodiment 1

Figure 2:
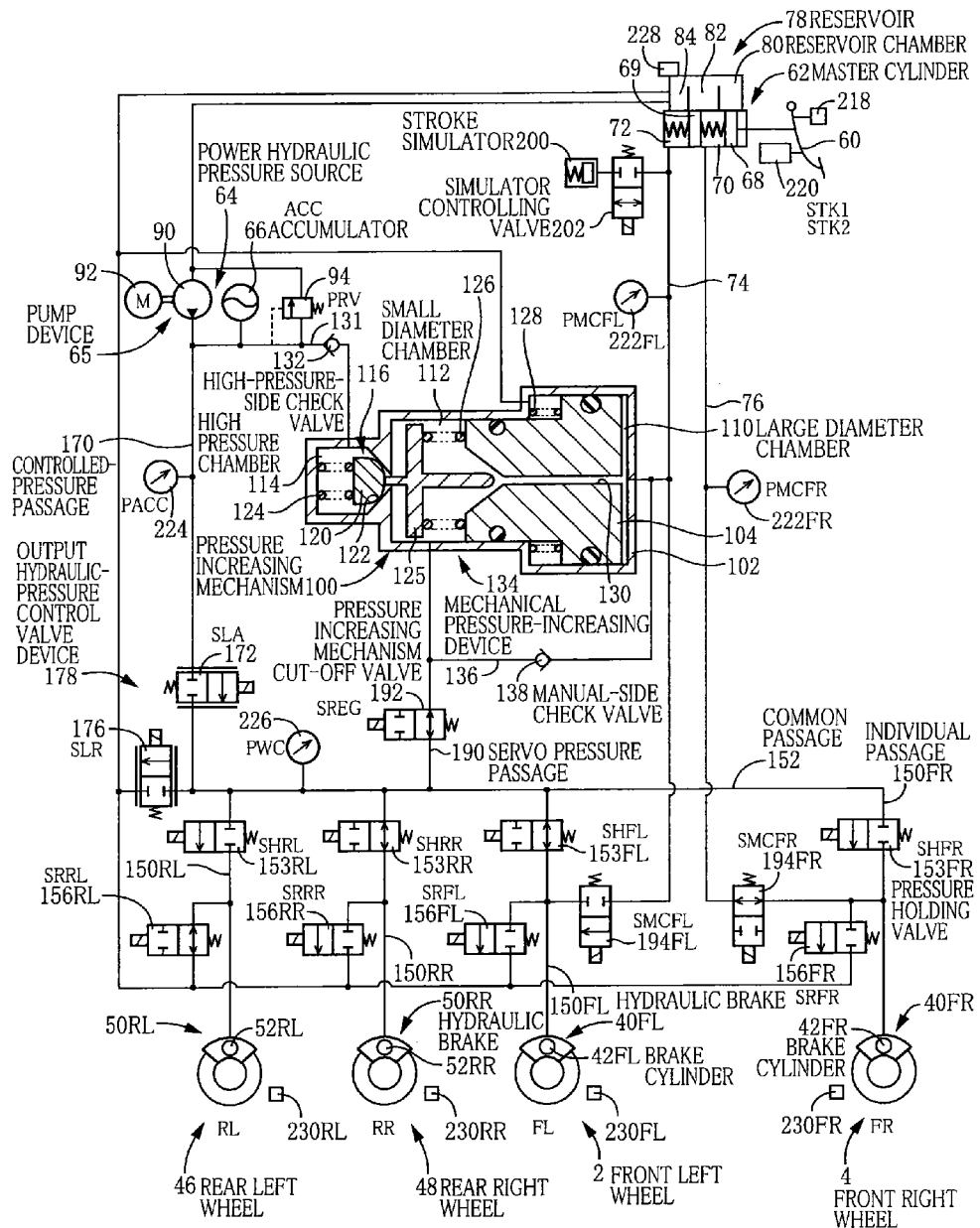
FIG. 2 is a diagram of a hydraulic circuit of the hydraulic brake system according to Embodiment 1 of the present invention.

The present brake system includes a brake circuit shown FIG. 2 in which reference sign "60" denotes a brake pedal as a brake operating member, reference sign "62" denotes a master cylinder as manual hydraulic pressure sources which is configured to generate hydraulic pressure by operation of the brake pedal 60, and reference sign "64" denotes a power hydraulic pressure source including a pump device 65 and an accumulator 66. The hydraulic brakes 40, 50 are to be activated by hydraulic pressures of the respective brake cylinders 42, 52. In the present embodiment, each of the hydraulic brakes 40, 50 is a disk brake.

It is noted that each of the hydraulic brakes 40, 50 may be a drum brake. It is further noted that each of the hydraulic brakes 40 provided for the front wheels 2, 4 may be a disk brake while each of the hydraulic brakes 50 provided for the rear wheels 46, 48 may be a drum brake.

The master cylinder 62 is a tandem cylinder including two pressurizing pistons 68, 69, and has pressurizing chambers 70, 72 such that the pressurizing chamber 70 is located on a front side of the pressurizing piston 68 while the pressurizing chamber 72 is located on a front side of the second pressurizing piston 69. In the present embodiment, each of the pressurizing chambers 70, 72 serve as a manual hydraulic pressure source. Further, to the pressurizing chambers 72, 70, the brake cylinders 42FL, 42FR of the hydraulic brakes 40FL, 40FR provided for the respective front left and right wheels 2, 4 are connected via respective master cylinder passages 74, 76 as manual-pressure-source passages.

Further, the pressurizing chambers 70, 72 are brought into communication with a reservoir 78, when the pressurizing pistons 68, 69 reach respective reverse end positions. The reservoir 78 defines therein an inside space that is partitioned into a plurality of reservoir chambers 80, 82, 84 configured to store therein working fluid. The reservoir chambers 80, 82 are provided for the pressurizing chambers 70, 72, while the reservoir chamber 84 is provided for the pump device 65.

In the power hydraulic pressure source 64, the pump device 65 includes a pump 90 and a pump motor 92, so that the working fluid is pumped from the reservoir chamber 84 of the reservoir 78 by activation of the pump 90, and the pumped working fluid is stored in the accumulator 66. The pump motor 92 is controlled such that the pressure of the working fluid stored in the accumulator 66 is held within a predetermined range. Further, a relief valve 94 is provided to prevent an excessive increase of pressure discharged from the pump 90.

A pressure increasing mechanism 100 as a high pressure generator is disposed between the power hydraulic pressure source 64 and the master cylinder passage 76. The pressure increasing mechanism 100 includes a housing 102 and a stepped piston 104 which is fluid-tightly, slidably fitted in the housing 102. The pressure increasing mechanism 100 has a large diameter chamber 110 located on a side of the a large diameter portion of the stepped piston 104 and a small diameter chamber 112 located on a side of a small diameter portion of the stepped piston 104.

The small diameter chamber 112 can be in communication with a high pressure chamber 114 that is connected to the power hydraulic pressure source 64. Further, a high-pressure supply valve 116 is disposed between the small diameter chamber 112 and the high pressure chamber 114. The high-pressure supply valve 116, which is a normally-close valve, includes a valve body 120, a valve seat 122 and a spring 124. The spring 124 generates a biasing force that causes the valve body 120 to be forced against the valve seat 122.

In the small diameter chamber 112, a valve opening member 125 is provided to be opposed to the valve body 120. A spring 126 is disposed between the valve opening member 125 and the stepped piston 104, and generates a biasing force that causes the valve opening member 125 to be moved in a direction away from the stepped piston 104.

Between the housing 102 and a stepped portion of the stepped piston 104, a spring 128 (i.e., return spring) is disposed to bias the stepped piston 104 in the rearward direction. It is noted that a stopper (not shown) is disposed between the stepped piston 104 and the housing 102, so as to define a forward end position of the stepped piston 104.

Further, the stepped piston 104 has a communication passage 130 through which the large diameter chamber 110 and the small diameter chamber 112 are to be in communication with each other. At least when the stepped piston 104 is positioned in the reverse end position, the stepped piston 104 is distant from the valve opening member 125 so that the large diameter chamber 110 and the small diameter chamber 112 are in communication with each other via the communication passage 130. When the stepped piston 104 is moved forwardly so as to be brought into contact with the valve opening member 125, the communication between the large diameter chamber 110 and the small diameter chamber 112 is cut off.

In the present embodiment, a mechanical pressure-increasing device 134 is constituted by, for example, the above-described housing 102, stepped piston 104, high-pressure supply valve 116 and valve opening member 125.

The high pressure chamber 114 and the power hydraulic pressure source 64 are connected through a high-pressure supplying passage 131 that is provided with a high-pressure-side check valve 132 which allows flow of the working fluid in a direction away from the power hydraulic pressure source 64 toward the high pressure chamber 114 and which inhibits flow of the working fluid in the opposite direction away from the high pressure chamber 114 toward the power hydraulic pressure source 64. When the hydraulic pressure of the power hydraulic pressure source 64 is higher than the hydraulic pressure in the high pressure chamber 114, the high-pressure-side check valve 132 allows flow of the working fluid in the direction away from the power hydraulic pressure source 64 toward the high pressure chamber 114. However, when the hydraulic pressure of the power hydraulic pressure source 64 is not higher than the hydraulic pressure in the high pressure chamber 114, the high-pressure-side check valve 132 is placed in its closed state thereby inhibiting not only the fluid flow in the opposite direction away from the high pressure chamber 114 toward the power hydraulic pressure source 64 but also the fluid flow in the direction away from the power hydraulic pressure source 64 toward the high pressure chamber 114. Therefore, even if a fluid leakage takes place in the power hydraulic pressure source 64, the flow of the working fluid in the opposite direction away from the high pressure chamber 114 toward the power hydraulic pressure source 64 is prevented whereby a reduction of the hydraulic pressure in the small diameter chamber 112 is prevented.

Further, between the master cylinder passage 70b and an output side of the mechanical pressure-increasing device 134 (or between the master cylinder passage 70b and the small diameter chamber 112), a bypass passage 136 is disposed to interconnect therebetween, bypassing the mechanical pressure-increasing device 134. The bypass passage 136 is provided with a manual-side check valve 138 which allows flow of the working fluid in a direction away from the master cylinder passage 74 toward the output side of the mechanical pressure-increasing device 134 and which inhibits flow of the working fluid in the opposite direction away from the output side of the mechanical pressure-increasing device 134 toward the master cylinder passage 74.

In the pressure increasing mechanism 100, when the hydraulic pressure is supplied to the large diameter chamber 110 from the pressurizing chamber 72 of the master cylinder 14, the working fluid is supplied to the small diameter chamber 112 via the communication passage 130.

When a force (generated by the hydraulic pressure in the large diameter chamber 110) acting on the stepped piston 104 in the forward direction becomes larger than the biasing force of the return spring 128, the stepped piston 104 is moved in the forward direction. When the communication passage 130 is closed by the valve opening member 125 as a result of contact of the stepped piston 104 with the valve opening member 125, the hydraulic pressure in the small diameter chamber 112 is increased and outputted.

Further, when the high-pressure supply valve 116 is turned to the open state as a result of forward movement of the valve opening member 125, the highly-pressurized working fluid is supplied from the high pressure chamber 114 to the small diameter chamber 112 whereby the hydraulic pressure in the small diameter chamber 112 is increased. On the other hand, the pressure of the working fluid stored in the accumulator 66 is higher than the pressure in the high pressure chamber 114, the hydraulic pressure in the accumulator 66 is supplied to the high pressure chamber 114 via the high-pressure-side check valve 132 and then supplied to the small diameter chamber 112.

The hydraulic pressure in the large diameter chamber 110 is adjusted such that the force (=hydraulic pressure in the master cylinder 62×pressure-receiving area) acting on a large diameter side of the stepped piston 104 and the force (=output hydraulic pressure×pressure-receiving area) acting on a small diameter side of the stepped piston 104 are balanced to each other, and then the adjusted hydraulic pressure in the large diameter chamber 110 is outputted. In this sense, the pressure increasing mechanism 100 may be referred to as a boosting mechanism.

Further, owing to the manual-side check valve 138, the hydraulic pressure outputted from the mechanical pressure-increasing device 134 is prevented from flowing toward the master cylinder passage 74.

On the other hand, when the hydraulic pressure in the accumulator 66 is not higher than the hydraulic pressure in the high pressure chamber 114, the working fluid is inhibited, by the high-pressure-side check valve 132, from flowing in either direction between the accumulator 66 and the high pressure chamber 114 whereby the stepped piston 104 cannot be moved further in the forward direction. Further, in this instance, there is a case where the stepped piston 104 cannot be moved further in the forward direction as a result of contact of the stepped piston 104 with the above-described stopper. When the hydraulic pressure in the pressurizing chamber 72 becomes, from this state, higher than the hydraulic pressure in the small diameter chamber 112, the hydraulic pressure is supplied to the output side of the mechanical pressure-increasing device 134 via the pressure-increasing-device-by-pass passage 136 and the manual-side check valve 138.

On the other hands, the brake cylinders 42FL, 42FR provided for the front left and right wheels 2, 4 and the brake cylinders 52RL, 52RR provided for the rear left and right wheels 46, 48 are connected to a common passage 152 via respective individual passages 150FL, 150FR, 150RL, 150RR, respectively.

The individual passages 150FL, 150FR, 150RL, 150RR are provided with respective pressure holding valves (SHij: i=F, R; j=L, 153FR, 153FL, 153RR, 153RL. Between the brake cylinders 42FL, 42FR, 52RL, 52RR and the reservoir 78, there are disposed pressure reducing valves (SRij: i=F, R; j=L, R) 156FL, 156FR, 156RL, 156RR.

In the present embodiment, each of the pressure holding valves 153FL, 153RR provided for the front left wheel 2 and rear right wheel 48 is a normally-open electromagnetic valve that is to be placed in an open state when electric current is not being supplied to a solenoid thereof. Meanwhile, each of the pressure holding valves 153FR, 153RL provided for the front right wheel 4 and rear left wheel 46 is a normally-closed electromagnetic valve that is to be placed in a closed state when electric current is not being supplied to a solenoid thereof.

Thus, one and the other of the pressure holding valves 153FL, 153FR provided for the front left and right wheels 2, 4 are constituted by the normally-open electromagnetic valve and the normally-closed electromagnetic valve, respectively. One and the other of the pressure holding valves 153RL, 153RR provided for the rear left and right wheels 46, 48 are constituted by the normally-open electromagnetic valve and the normally-closed electromagnetic valve, respectively.

Further, each of the pressure holding valves 153FL, 153RR provided for two wheels (i.e., the front left wheel 2 and rear right wheel 48) which are located in respective positions diagonal to each other, is constituted by the normally-open electromagnetic valve. Each of the pressure holding valves 153FR, 153RL provided for other two wheels (i.e., the front right wheel 4 and rear left wheel 46) which are located in respective positions diagonal to each other, is constituted by the normally-closed electromagnetic valve.

Further, each of the pressure reducing valves 156FL, 156FR, 156RR is constituted by a normally-closed electromagnetic valve, while the pressure reducing valve 156RL provided for the rear left wheel 46 is constituted by a normally-open electromagnetic valve.

To the common passage 152 to which the brake cylinders 42, 52 are connected, the power hydraulic pressure source 64 and the pressure increasing mechanism 100 are also connected.

The power hydraulic pressure source 64 is connected to the common passage 152 via a controlled-pressure passage 170. The controlled-pressure passage 170 is provided with a pressure-increasing linear control valve (SLA) 172. A pressure-reducing linear control valve (SLR) 176 is provided between the controlled-pressure passage 170 and the reservoir 78. With the pressure-increasing linear control valve 172 and pressure-reducing linear control valve 176 being controlled, the hydraulic pressure outputted by the power hydraulic pressure source 64 is controlled, and the controlled hydraulic pressure is supplied to the common passage 152. The pressure-increasing linear control valve 172 and the pressure-reducing linear control valve 176 cooperate to constitute an output hydraulic-pressure control valve device 178. Further, each of the pressure-increasing linear control valve 172 and pressure-reducing linear control valve 176 may be referred to as an output hydraulic-pressure control valve. Each of the pressure-increasing linear control valve 172 and pressure-reducing linear control valve 176 is a normally-closed electromagnetic valve which is to be placed in a closed state when electric current is not being supplied to a solenoid thereof, and which is configured to output hydraulic pressure whose amount is continuously controlled by continuously controlling an amount of the electric current supplied to the solenoid.

Figure 3:
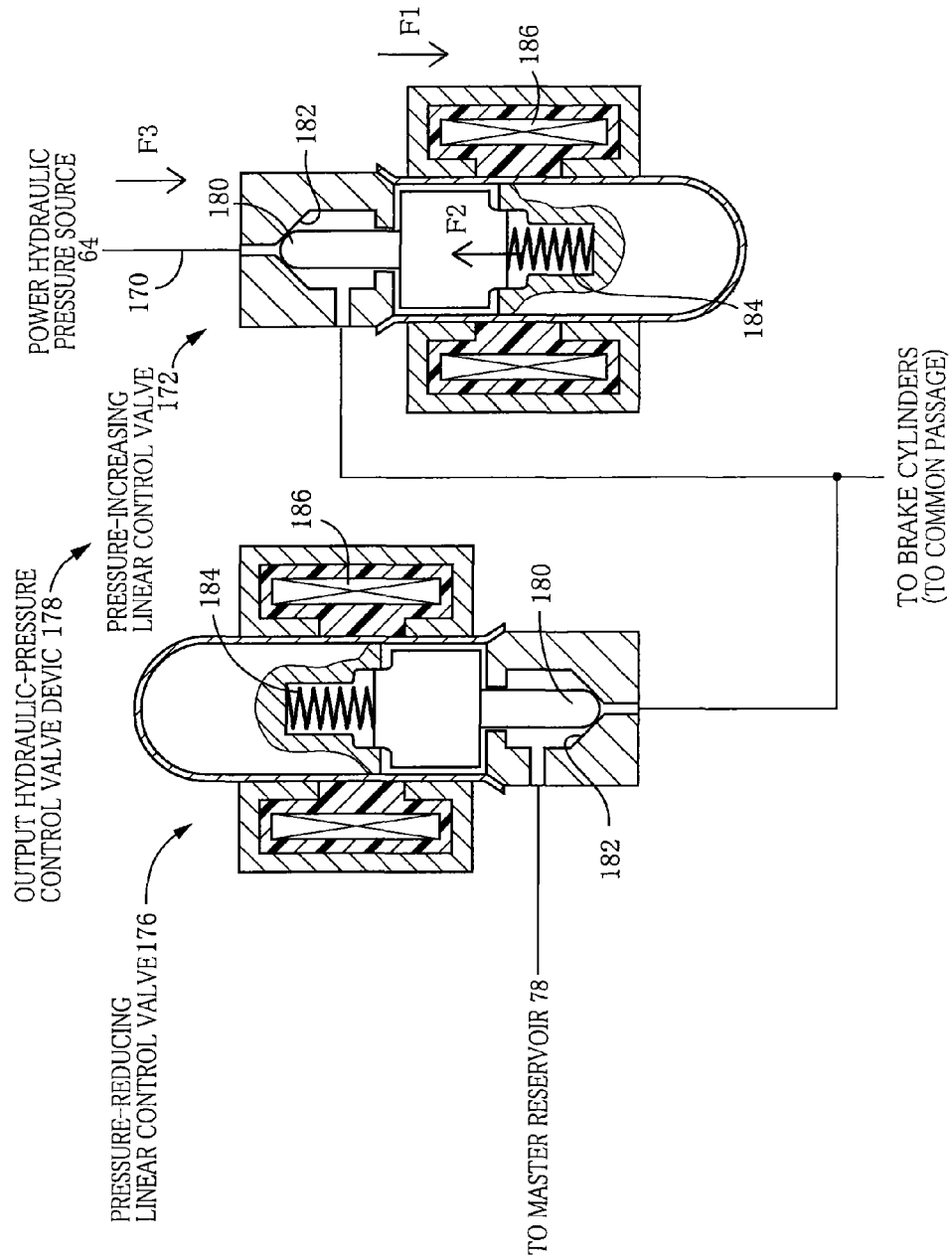
FIG. 3 is a cross sectional view showing a pressure-increasing linear control valve and a pressure-reducing linear control valve that are included in the hydraulic brake system.

As shown in FIG. 3, each of the pressure-increasing linear control valve 172 and pressure-reducing linear control valve 176 includes a valve body 180, a valve seat 182 (that cooperates with the valve body 120 to constitute a seating valve), a spring 184 and a solenoid 186. The spring 184 generates a biasing force F2 forcing the valve body 180 in a direction toward the valve seat 182. The solenoid 186, when electric current is being applied thereto, generates a driving force F1 forcing the valve body 180 in a direction away from the valve seat 182. Further, in the pressure-increasing linear control valve 172, a pressure-difference-based force F3, which is generated based on a difference between pressure in the power hydraulic pressure source 64 and pressure in the common passage 152, acts on the valve body 180, forcing the valve body 180 to be displaced in a direction away from the valve seat 182. In the pressure-reducing linear control valve 176, a pressure-difference-based force F3, which is generated based on a difference between pressure in the common passage 152 (controlled-pressure passage 170) and pressure in the reservoir 78, acts on the valve body 180, forcing the valve body 180 to be displaced in a direction away from the valve seat 182 (F1+F3: F2). In each of the valves 172, 176, the pressure-difference-based force F3 is controlled by controlling the electric current that is supplied to the solenoid 186, whereby the hydraulic pressure in the controlled-pressure passage 170 is controlled. Further, it can be also considered that the hydraulic pressure in the common passage 152 is controlled by controlling the pressure-increasing linear control valve 172 and pressure-reducing linear control valve 176.

The pressure increasing mechanism 100 is connected to the common passage 152 via a servo pressure passage 190 that is provided with a pressure increasing mechanism cut-off valve (SREG) 192 as a high-pressure-generator cut-off valve. The pressure increasing mechanism cut-off valve 192 is constituted by a normally-open electromagnetic valve.

On the other hand, the master cylinder passage 74 is connected to a portion of the individual passage 150FL provided for the front left wheel 2, which portion is located on a downstream side of the pressure holding valve 153FL. Meanwhile, the master cylinder passage 76 is connected to a portion of the individual passage 150FR provided for the front right wheel 4, which portion is located on a downstream side of the pressure holding valve 153FR. A master-cylinder cut-off valve (SMCFR) 194FL as a manual-pressure-source cut-off valve is provided on a midway of the master cylinder passage 74, while another master-cylinder cut-off valve (SMCFL) 194FR as another manual-pressure-source cut-off valve is provided on a midway of the master cylinder passage 76. The master-cylinder cut-off valve 194FL is a normally-closed electromagnetic valve while the master-cylinder cut-off valve 194FR is a normally-open electromagnetic valve.

Further, a stroke simulator 200 is connected to the master cylinder passage 74 via a simulator controlling valve 202 that is a normally-closed electromagnetic valve.

In the present embodiment, as described above, the above-described power hydraulic pressure source 64, output hydraulic-pressure control valve device 178, master-cylinder cut-off valves 194, pressure holding valve 153, pressure reducing valves 156 and pressure increasing mechanism cut-off valve 192 cooperate to constitute the hydraulic-pressure controlling portion 54 that is controlled based on commands supplied from the brake ECU 56. As shown in FIG. 1, the brake ECU 56 is constituted principally by a computer including an executing portion, an input/output portion and a memory portion. To the input/output portion, there are connected, for example, a brake switch 218, a stroke sensor 220, a master-cylinder pressure sensor 222, an accumulator pressure sensor 224, a brake-cylinder pressure sensor 226, a level warning switch 228, a wheel velocity sensor 230, a door opening/closing switch 232, an ignition switch 234, an acceleration switch 236 and the above-described hydraulic-pressure controlling portion 54.

The brake switch 218 is a switch, which is turned from its OFF state to its ON state when the brake pedal 60 is operated.

The stroke sensor 220 is configured to detect an operating stroke (STK) of the brake pedal 60. In the present embodiment, the stroke sensor 220 is constituted by two sensors both of which are configured to detect the operating stroke of the brake pedal 60 in the same manner.

The master-cylinder pressure sensor 222 is constituted by two sensors that are provided in the respective master cylinder passages 74, 76. The two sensors of the master-cylinder pressure sensor 222 are configured to detect the hydraulic pressures (PMCFL, PMCFR) in the pressurizing chambers of the master cylinder 62, which are equal in magnitude to each other in most cases.

Thus, in the present embodiment, each of the stroke sensor 220 and the master-cylinder pressure sensor 222 constitutes two lines, so that, even in the event of failure of one of the two sensors of each of the stroke sensor 220 and the master-cylinder pressure sensor 222, a brake operating state can be detected by the other of the two sensors which functions normally.

The accumulator pressure sensor 224 is configured to detect pressure (PACC) of working fluid stored in the accumulator 66.

The brake-cylinder pressure sensor 226 is provided in the common passage 152, and is configured to detect pressure (PWC) in each of the brake cylinders 42, 52. When each of the pressure holding valves 153 is placed in the open state, the common passage 152 is held in communication with each of the brake cylinders 42, 52, so that the hydraulic pressure in each of the brake cylinders 42, 52 can be made equal to the hydraulic pressure in the common passage 152.

The level warning switch 228 is a switch which is to be turned to the OFF state when the working fluid reserved in the reservoir 78 becomes not larger than a predetermined amount. In the present embodiment, when the amount of the working fluid reserved in one of the three reservoir chambers 80, 82, 84 becomes not larger than a predetermined amount, the level warning switch 228 is turned to the OFF state.

The wheel velocity sensor 230 is provided for each of the front right wheel 4, front left wheel 2, rear right wheel 48 and rear left wheel 46, so as to detect rotational velocity of each of the wheels. A running velocity of the vehicle is obtained based on the rotational velocities of the four wheels.

The door opening/closing switch 232 is configured to detect opening and closing of a door of the vehicle. The switch 232 may be configured to either detect the opening/closing of a door of a vehicle-operator side or detect the opening/closing of any one of the other doors. The door opening/closing switch 232 may be constituted by a door courtesy lamp switch of the vehicle.

The ignition switch (IGSW) 234 is a main switch of the vehicle. The acceleration switch 236 is a switch that is to be placed in ON state when an acceleration operating member (not shown) is being operated.

Further, to the CAN 59, there are connected, for example, a following distance ECU 240 and a collision avoidance ECU 242. The brake ECU 56 controls the hydraulic-pressure controlling portion 54, for example, in accordance with braking commands supplied from these ECUs 240, 242.

Moreover, the memory portion stores therein, for example, various programs and tables.

<Initial Checks>

In the present embodiment, checks are carried out upon satisfaction of a predetermined check starting condition. This check starting condition is satisfied, for example, when the door opening/closing switch 232 is turned to the ON state, and when a brake operation is carried out for the first time after the ignition switch 234 has been turned to the ON state.

Figure 4:
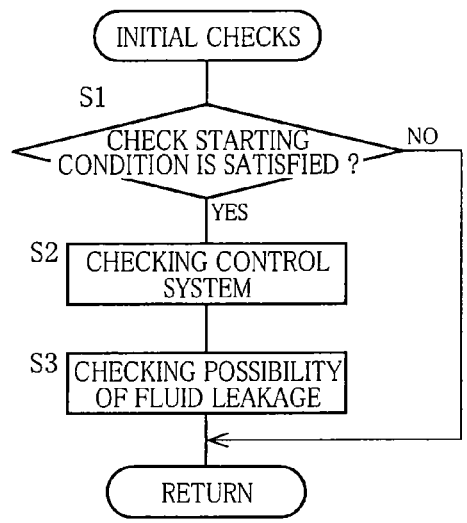
FIG. 4 is a flow chart representing an initial-check program stored in a memory portion of a brake ECU that is included in the hydraulic brake system.

FIG. 4 is a flow chart showing an initial checking program that is executed at a predetermined time interval.

The execution of this initial checking program is initiated with step S1 that is implemented to judge whether the predetermined check starting condition is satisfied or not. When the check starting condition is satisfied, step S2 is implemented to check the control system, and step S3 is implemented to check possibility of fluid leakage.

For detecting failure of the control system, for example, it is judged whether or not there is a breaking of wire for each of all the electromagnetic valves (e.g., pressure-increasing linear control valve 172, pressure-reducing linear control valve 176, pressure holding valve 153, pressure reducing valve 156, master-cylinder cut-off valve 194, pressure increasing mechanism cut-off valve 192), and it is judged whether or not there is a breaking of wire for each of all the sensors (e.g., brake switch 218, stroke sensor 220, master-cylinder pressure sensor 222, accumulator pressure sensor 224, brake-cylinder pressure sensor 226, wheel velocity sensor 230).

The possibility of the fluid leakage is checked, for example, when the ignition switch 234 is turned to the ON state, and when the brake operation is carried out. It is judged that there is no fluid leakage, for example, (a) when the level warning switch 228 is in the ON state, and (b) when there is established a predetermined relationship between the stroke of the brake pedal 60 and the hydraulic pressure in the master cylinder 62 upon execution of the brake operation. On the other hand, it is judged that there is a possibility of fluid leakage, when the hydraulic pressure in the master cylinder 62 is low relative to the stroke of the brake pedal 60. Further, it is judged that there is a possibility of fluid leakage, (c) when a value detected by the accumulator pressure sensor 224 does not reach a fluid-leakage-judgment threshold value even after continuation of activation of the pump 90 for a predetermined length of time, (d) when the value detected by the brake-cylinder pressure sensor 226 is low relative to a value detected by the master-cylinder pressure sensor 222 while the regenerative cooperative control is not being carried out, and (e) when it was judged that there was a possibility of fluid leakage upon previous brake activation (when the hydraulic pressure in the master cylinder 62 was supplied to the brake cylinders 42 for the front left and right wheels 2, 4, while the pump pressure was supplied to the brake cylinders 52 for the rear left and right wheels 46, 48).

Thus, in the present embodiment, the possibility of the fluid leakage is detected based on the above-described conditions (a)-(e). There is a case where a fluid leakage does not actually take place even when it is judged that there is a possibility of the fluid leakage, because the above-described conditions (b)-(e) could be satisfied by a factor other than the fluid leakage. Further, there is a case where an amount of the fluid leakage is small when the fluid leakage actually takes place. However, even in these cases, it is judged that there is a possibility of the fluid leakage, because it is not possible to assert that there is no possibility of the fluid leakage.

<Brake Hydraulic Pressure Control>

Figure 5:
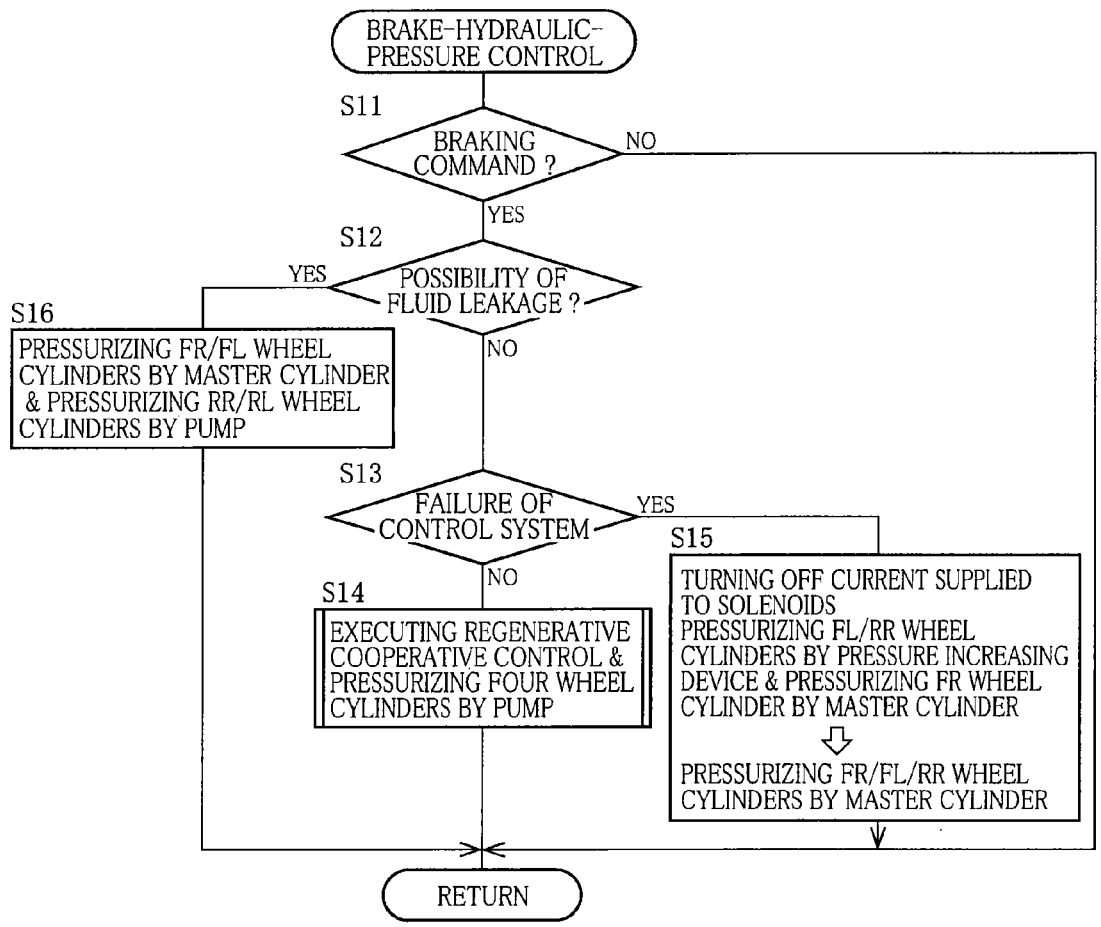
FIG. 5 is a flow chart representing a hydraulic-pressure-supply control program stored in the memory portion of the brake ECU that is included in the hydraulic brake system.

Then, the hydraulic pressures supplied to the brake cylinders 42, 52 are controlled based on result of the above-described initial checks. FIG. 5 is a flow chart representing a brake-hydraulic-pressure controlling program that is executed at a predetermined time interval.

In step S11, it is judged whether a braking command is issued or not. A positive judgment (YES) is obtained in step S11, for example, when the brake switch 218 is in the ON state, and when a command requesting activation of an automatic brake is issued. Since there is a case where the automatic brake is activated upon executions of a traction control, a vehicle stability control, a following distance control and a collision avoidance control, it is judged that the braking command is issued upon satisfaction of conditions required for starting theses controls.

When it is judged that the braking command is issued, the control flow goes to steps S12 and S13 that are implemented to read results of the judgment as to whether or not there is a possibility of the fluid leakage and the judgment as to whether or not the control system suffers from the failure.

When negative judgments (NO) are obtained in both of these judgments, namely, when the brake system functions normally (i.e., when it is judged that the control system functions normally and that there is no possibility of the fluid leakage), the control flow goes to step S14 that is implemented to carry out a regenerative cooperative control.

When it is judged that the control system suffers from the failure, namely, when a positive judgment (YES) is obtained in step S13, the control flow goes to step S15 in which supply of the electric current to the solenoids of all the electromagnetic valves is stopped so that all the electromagnetic valves are placed in the respective original positions. Further, the pump motor 92 is kept inactivated.

When it is judged that there is a possibility of the fluid leakage, namely, when a positive judgment (YES) is obtained in step S12, the control flow goes to step S16 in which the hydraulic pressure in the master cylinder 62 is supplied to the brake cylinders 42 for the front left and right wheels 2, 4 while the hydraulic pressure controlled by the output hydraulic-pressure control valve device 178 is supplied to the brake cylinders 52 for the rear left and right wheels 46, 48. It is rare that the control system suffers from the failure and also there is a possibility of the fluid leakage. Therefore, when it is judged that there is a possibility of the fluid leakage, it is regarded that the control system functions normally thereby making it possible to control the electromagnetic valves and to activate the pump motor 92.

In the event of failure of the electric system, no electric current is supplied to the brake system so that the electromagnetic valves are returned to their original positions and the pump motor 92 is kept inactivated. That is, in the event of failure of the electric system, the brake system is placed in the same state as in the event of failure of the control system.

Further, in the present embodiment, the automatic brake is inhibited from being carried out, when it is regarded that the control system fails and when it is regarded that there is a possibility of fluid leakage.

1) In Case of Normality of System

To the brake cylinders 42, 52 for the four wheels 4, 2, 48, 46, the controlled hydraulic pressure (i.e., fluid pressurized by the pump) is supplied from the power hydraulic pressure source 64, so that the regenerative cooperative control is in principle executed.

The regenerative cooperative control is executed for equalizing an actual total braking torque to a total required braking torque, wherein the actual total braking torque is a sum of the regenerative braking torque applied to the driving wheels 2, 4 and a friction braking torque applied to the driven wheels 46, 48 as well as to the driving wheels 2, 4.

The total required braking torque corresponds to a braking torque required by the vehicle operator, when the total required braking torque is obtained based on values detected by the stroke sensor 220 and the master-cylinder pressure sensor 222. The total required braking torque corresponds to a braking torque required in the traction control or vehicle stability control, when the total required braking torque is obtained based on information supplied from, for example, the following distance ECU 240 and the collision avoidance ECU 242. Then, a required regenerative braking torque is determined based on the above-described total required braking torque and information which is supplied from the hybrid ECU 58 and which contains data indicative of a generator-side upper limit value and a storage-side upper limit value. The generator-side upper limit value is an upper limit value of the regenerative braking torque, which is dependent on, for example, number of rotations of the electric motor 20, while the storage-side upper limit value is an upper limit value of the regenerative braking torque, which is dependent on, for example, a storage capacity of the storage device 22. That is, the smallest one of the total required braking torque (required value), generator-side upper limit value and storage-side upper limit value is determined as the required regenerative braking torque, and then information representing the determined required regenerative braking torque is supplied to the hybrid ECU 58.

The hybrid ECU 58 supplies information representing the required regenerative braking torque, to the motor ECU 28. Then, the motor ECU 28 supplies a control command to the conversion device 26 such that the braking torque applied to the front left and right wheels 2, 4 by the electric motor 20 is made equal to the required regenerative braking torque. In this instance, the electric motor 20 is controlled by the conversion device 26.

The motor ECU 28 supplies information representing activation state of the electric motor 20 such as an actual number of revolutions of the motor 20, to the hybrid ECU 58. In the hybrid ECU 58, an actual regenerative braking torque is obtained based on the actual activation state of the electric motor 20, and information representing a value of the actual regenerative braking torque is supplied to the brake ECU 56.

The brake ECU 56 determines a required hydraulic braking torque based on, for example, a value obtained by subtracting the actual regenerative braking torque from the total required braking torque, and then controls valves such as the pressure-increasing linear control valve 172 and pressure-reducing linear control valve 176, such that the brake cylinder hydraulic pressure becomes close to a target hydraulic pressure that establishes the required hydraulic braking torque.

Figure 6:
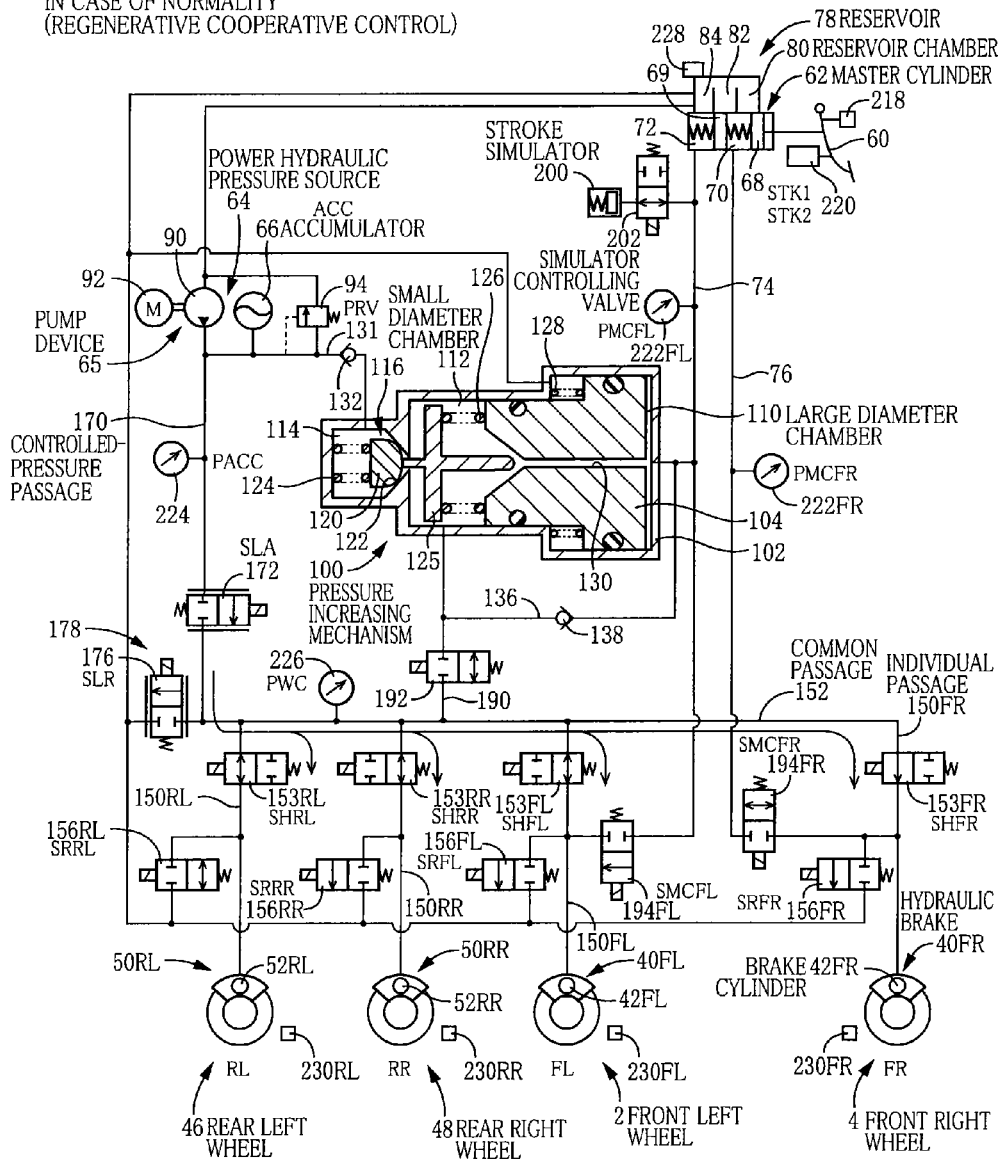
FIG. 6 is a view showing a state upon execution of the hydraulic-pressure-supply control program in the hydraulic brake system (in case of normality of the system).

During the regenerative cooperative control, in principle, all the pressure holding valves 153FR, 153FL, 153RR, 153RL provided for the respective four wheels 4, 2, 48, 46 are placed in the open states while all the pressure reducing valves 156FL, 156FR, 156RL, 156RR provided for the respective four wheels 4, 2, 48, 46 are placed in the closed states, as shown in FIG. 6. Further, the master-cylinder cut-off valves 194FR, 194FL are placed in the closed states, the simulator controlling valve 202 is placed in the open state, and the pressure increasing mechanism cut-off valve 192 is placed in the closed state. With the common passage 152 being isolated from the pressure increasing mechanism 100, and with the brake cylinders 42FR, 42FL provided for the front right and left wheels 4, 2 being isolated from the master cylinder 62, the pressure-increasing linear control valve 172 and the pressure-reducing linear control valve 176 are controlled so as to control hydraulic pressure, and the controlled hydraulic pressure is supplied to the common passage 152 and the brake cylinders 42, 52 provided for the respective four wheels.

In this state, if a braking slip of the wheels 2, 4, 46, 48 is excessively large so as to satisfy an anti-lock control starting condition, the pressure holding valves 153 and pressure reducing valves 156 are opened or closed independently of one another whereby the hydraulic pressure in each of the brake cylinders 42, 52 is controlled, so that a slipping state of each of the front right, front left, rear right and rear left wheels 4, 2, 48, 46 is optimized.

Further, in a case where the hydraulic brake system is installed on a vehicle which is not provided with the electric drive device 6, i.e., on a vehicle in which the regenerative cooperative control is not executed, the output hydraulic-pressure control valve device 178 is controlled such that the hydraulic braking torque is made equal to the total required braking torque.

2) In Case of Failure of Control System
(In Case of Failure of Electric System)

Figure 7:
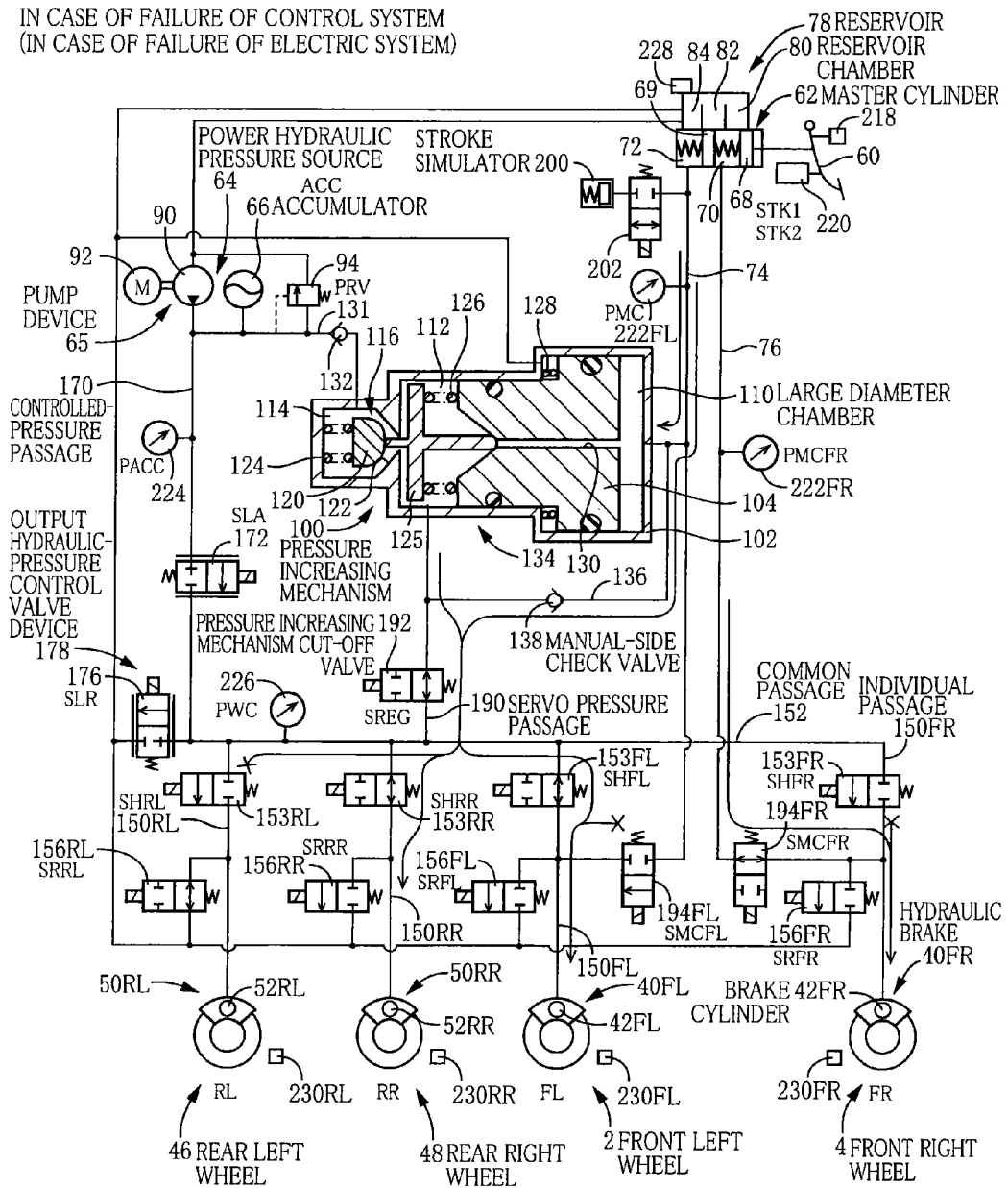
FIG. 7 is a view showing another state upon execution of the hydraulic-pressure-supply control program in the hydraulic brake system (in case of failure of a control system of the brake system).

As shown in FIG. 7, all the electromagnetic valves are placed back in the respective original positions.

The pressure-increasing linear control valve 172 and the pressure-reducing linear control valve 176 are placed in the closed states, by not supplying the electric current to the solenoids 186, whereby the power hydraulic pressure source 64 is isolated from the common passage 152.

Further, since the pressure increasing mechanism cut-off valve 192 is placed in the open state, the pressure increasing mechanism 100 is in communication with the common passage 152.

Further, the pressure holding valves 153FR, 153RL are placed in the closed states while the pressure holding valves 153FL, 153RR are placed in the open states, so that the brake cylinders 42FL, 52RR provided for the front left and rear right wheels 2, 48 are in communication with the common passage 152 while the brake cylinders 42FR, 52RL provided for the front right and rear left wheels 4, 46 are isolated from the common passage 152.

The hydraulic pressures are generated in the pressurizing chambers 70, 72 of the master cylinder 62, by operation of the brake pedal 60.

The hydraulic pressure generated in the pressurizing chamber 72 is supplied to the pressure increasing mechanism 100 whereby the pressure increasing mechanism 100 is activated. By forward movement of the stepped piston 104, the small diameter chamber 112 is isolated from the large diameter chamber 110 whereby the hydraulic pressure in the small diameter chamber 112 is increased. The valve opening member 125 is moved forwardly whereby the high-pressure supply valve 116 is placed in the open state. Further, the highly pressurized working fluid is supplied from the accumulator 66 to the high pressure chamber 114 via the high-pressure-side check valve 132, and is then supplied to the small diameter chamber 112. The hydraulic pressure (servo pressure) in the small diameter chamber 112 is made higher than the hydraulic pressure in the master cylinder 62 (namely, the brake operating force is boosted), and is supplied to the common passage 152 via the pressure increasing mechanism cut-off valve 192 placed in the open state and then supplied to the brake cylinders 42FL, 52RR provided for the front left and rear right wheels 2, 48 via the pressure holding valves 153FL, 153RR.

In this instance, since the master-cylinder cut-off valve 194FL provided for the front left wheel 2 is placed in the closed state, it is possible to prevent the servo pressure supplied to the brake cylinder 42FL, from flowing out to the master cylinder 62. Therefore, the hydraulic brake 40FL can be activated satisfactorily.

The pump device 65 remains inactivated so that the hydraulic pressure in the accumulator 66 is reduced eventually. When the hydraulic pressure in the accumulator 66 has become not higher than the hydraulic pressure in the high pressure chamber 114, the flow of the working fluid between the accumulator 66 and the high pressure chamber 114 is inhibited whereby the forward movement of the stepped piston 104 is inhibited. Further, in this instance, there is a case where the forward movement of the stepped piston 104 is inhibited by the contact of the stepped piston 104 with the above-described stopper. Thus, the hydraulic pressure in the small diameter chamber 112 is not further increased so that the mechanical pressure-increasing device 134 cannot exhibit a boosting performance.

Meanwhile, when the hydraulic pressure in the pressurizing chamber 72 of the master cylinder 62 has become higher than the hydraulic pressure in the small diameter chamber 112, as a result of increase of the operating force applied to the brake pedal 60, the hydraulic pressure is supplied from the pressurizing chamber 72 to the small diameter chamber 112

(i.e., an output side portion of mechanical pressure-increasing device 134) via the pressure-increasing-device-bypass passage 136 and the manual-side check valve 138, and also to the brake cylinders 42FL, 52RR provided for the front left and rear right wheels 2, 48 via the pressure increasing mechanism cut-off valve 192 and the pressure holding valves 153FL, 153RR.

In this instance, the hydraulic pressure of the pressurizing chamber 72 of the master cylinder 62 is supplied to the brake cylinders 42FL, 52RR provided for the front left and rear right wheels 2, 48, while not being boosted.

Further, since the pressure holding valves 153FR, 153RL are placed in the closed states, the hydraulic pressure of the pressurizing chamber 72 is inhibited from being supplied to the brake cylinders 42FR, 52RL provided for the front right and rear left wheels 4, 46.

A maximum amount of the working fluid suppliable from the pressurizing chamber 72 as a chamber of the master cylinder 62 is limited. Therefore, if the working fluid is to be supplied to a large number of the brake cylinders, there could be a problem that the hydraulic pressure in each of the bake cylinders cannot be sufficiently increased. Moreover, a pressure receiving area of a piston of each of the brake cylinders 42 for the front wheels is larger than a pressure receiving area of a piston of each of the brake cylinders 52 for the rear wheels. Therefore, the hydraulic pressure in each of the front-wheel brake cylinders 42 and the hydraulic pressure in each of the rear-wheel brake cylinders 52 are to be equalized to each other, the working fluid is consumed more in each front-wheel brake cylinder 42 than in each rear-wheel brake cylinder 52.

Thus, there would be a risk of shortage of the braking force in an arrangement in which the hydraulic pressure of the pressurizing chamber 72 is supplied to the brake cylinders 42FL, 42FR provided for the front left and right wheels 2, 4.

On the other hand, it might be possible to employ an arrangement in which the hydraulic pressure of the pressurizing chamber 72 is supplied to the brake cylinders provided for two wheels located in respective positions of the same side in a lateral direction of the vehicle, for example, to the brake cylinders 42FL, 52RL provided for the front left and rear left wheels 2, 46. However, in this arrangement, there would be a risk of generation of a yaw moment.

In the present embodiment in which the hydraulic pressure of the pressurizing chamber 72 of the master cylinder 62 is supplied to the brake cylinders provided for two wheels located in respective positions diagonal to each other, i.e., to the brake cylinders 42FL, 52RR provided for the front left and rear right wheels 2, 48, it is possible to cause the two hydraulic brakes 40FL, 50RR to be satisfactorily activated, while restraining generation of a yaw moment.

Meanwhile, to the brake cylinder 42FR provided for the front right wheel 4, the hydraulic pressure is supplied from the pressurizing chamber 70 of the master cylinder 62 via the master master-cylinder cut-off valve 194FR that is placed in the open state.

To the brake cylinder 52RL provided for the rear left wheel 46, no hydraulic pressure is supplied.

Thus, in the present embodiment, in the event of failure of the control system or failure of the electric system, the hydraulic pressures of the pressure increasing mechanism 100 and the master cylinder 62 are supplied to the brake cylinders 42FL, 42FR, 52RR provided for the three wheels. Consequently, a total brake force applied to an entirety of the vehicle can be made larger than in an arrangement in which the hydraulic pressure is supplied to the brake cylinders provided for the two wheels.

Further, as long as the pressure increasing mechanism 100 is being activated, the servo pressure is supplied to the front left wheel 2, the master cylinder pressure is supplied to the front right wheel 4 and the servo pressure is supplied to the rear right wheel 48, so that a difference between the braking force applied to a left-side portion of the vehicle and the braking force applied to a right-side portion of the vehicle is made small whereby generation of a yaw moment can be further restrained.

3) In Case of Detection of Possibility of Fluid Leakage

Figure 8:
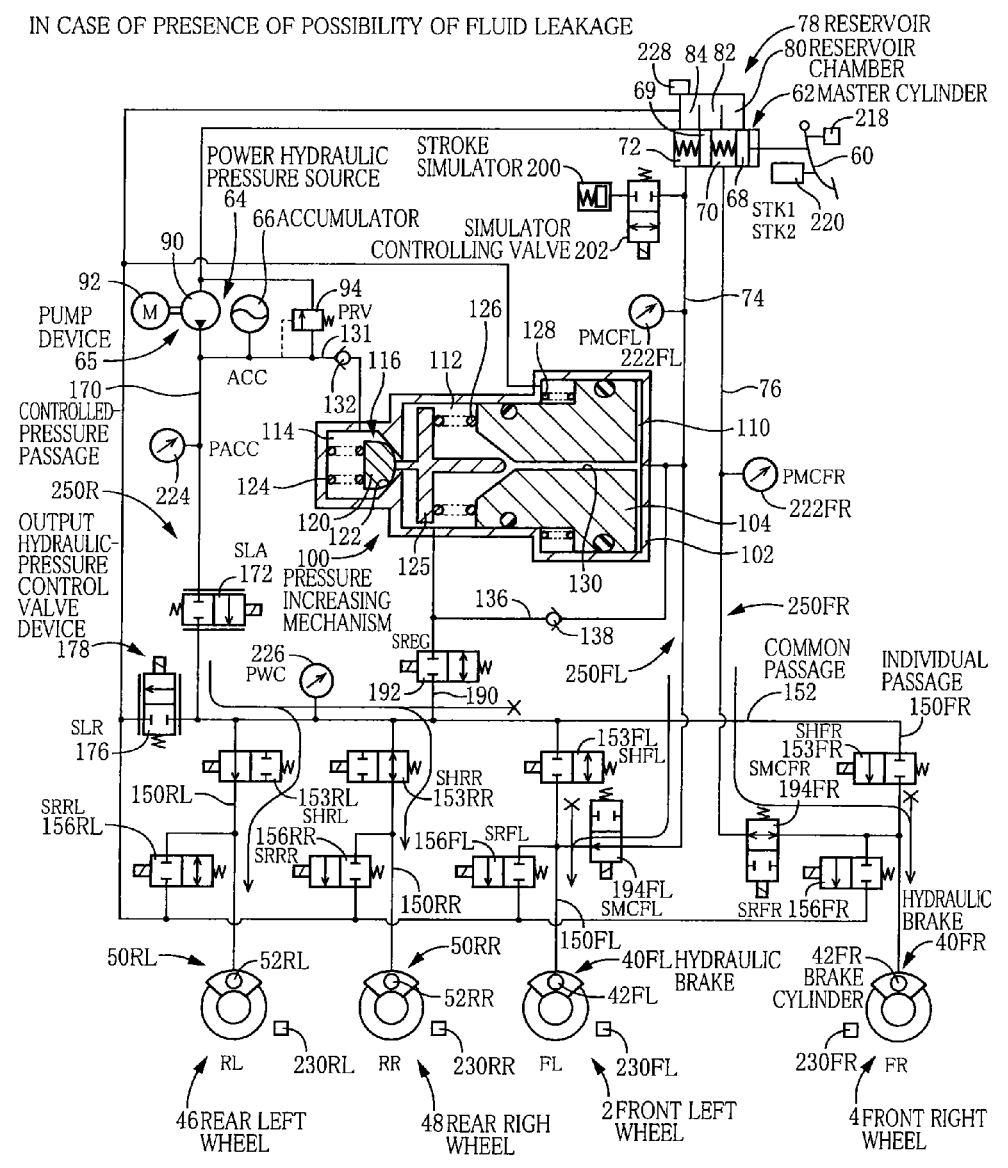

As shown in FIG. 8, the pressure holding valves 153FR, 153FL provided for the front right and left wheels 4, 2 are placed in the closes states while the pressure holding valves 153RR, 153RL provided for the rear right and left wheels 48, 46 are placed in the open states. Further, the master-cylinder cut-off valves 194FR, 194FL are placed in the open states, the pressure increasing mechanism cut-off valve 192 is placed in the closed state and the simulator controlling valve 202 is placed in the closed state. Further, all the pressure reducing valves 156 are placed in the closed states. As described above, the hydraulic pressure of the master cylinder 62 is supplied to the brake cylinders 42FL, 42FR provided for the front left and right wheels 2, 4 while the hydraulic pressure of the pump device 65 is supplied to the brake cylinders 52RL, 52RR of the rear left and right wheels 46, 48.

Since the pressure holding valves 153FR, 153FL provided for the front right and left wheels 4, 2 are placed in the closes states, the brake cylinders 42FR, 42FL provided for the front right and left wheels 4, 2 are isolated from each other, and are isolated from the brake cylinders 52RR, 52RL provided for the rear right and left wheels 48, 46. Thus, the brake cylinder for each front wheel and the brake cylinder for each rear wheel are isolated from each other, and the brake cylinders provided for the front left and right wheels 2, 4 are isolated from each other. That is, three brake lines (consisting of a brake line 250FL including the brake cylinder 42FL provided for the front left wheel 2, a brake line 250FR including the brake cylinder 42FR provided for the front right wheel 4 and a brake line 250R including the brake cylinders 52RL, 52RR provided for the rear left and right wheels 46, 48) are isolated from one another. Consequently, even if one of the three brake lines 250FL, 250FR, 250R suffers from the fluid leakage, the other brake lines are not influenced by the fluid leakage taking place in the one of the three brake lines.

Further, since the pressure increasing mechanism cut-off valve 192 is placed in the closed state, it is possible to prevent the working fluid supplied to the common passage 152 from the power hydraulic pressure source 64, from flowing out to the pressure increasing mechanism 100. In the present embodiment, the presence of possibility of fluid leakage is detected, but it is not specified which part of the brake system suffers from the fluid leakage. In a case when the fluid leakage takes place in the brake line 250FL, since the highly-pressurized hydraulic pressure cannot be supplied to the large diameter chamber 110, the pressure increasing mechanism 100 is kept inactivated. The stepped piston 104 is positioned in the reverse end position whereby the small diameter chamber 112 and the large diameter chamber 110 are in communication with each other via the communication passage 130. In this instance, if the pressure increasing mechanism cut-off valve 192 were in the open state, the common passage 152 and the pressurizing chamber 72 would be in communication with each other via the communication passage 130, thereby causing a risk of flow of the hydraulic pressure from the common passage 152 back to the pressurizing chamber 72. However, by placing the pressure increasing mechanism cut-off valve 192 in the closed state, it is possible to satisfactorily prevent the working fluid from flowing out from the common passage 152 toward the master cylinder 62 and accordingly to supply the controlled pressure to the brake cylinders 52RL, 52RR provided for the rear left and right wheels 46, 48.

In the present embodiment, the brake line 250 includes the brake cylinder 42FR, master cylinder passage 76, pressurizing chamber 70 and reservoir chamber 80. The brake line 250FL includes the brake cylinder 42FL, master cylinder passage 74, pressurizing chamber 72 and reservoir chamber 82. The brake line 250R includes the brake cylinders 52RL, 52RR, individual passages 150RL, 150RR, power hydraulic pressure source 64 and reservoir chamber 84.

4) In Case of Release of Hydraulic Brake

Upon release of the brake operation, all the electromagnetic valves are placed in the original positions, as shown in FIG. 2, since electric current is not supplied to the solenoids of the electromagnetic valves. Further, in the pressure increasing mechanism 100, the stepped piston 104 is returned to the reverse end position whereby the large diameter chamber 110 and the small diameter chamber 100 are brought into communication with each other via the communication passage 130.

The hydraulic pressure of the brake cylinder 42FR provided for the front right wheel 4 is returned to the master cylinder 62 and the reservoir 78 via the master-cylinder cut-off valve 194FR that is placed in the open state. The hydraulic pressure of the brake cylinder 42FL provided for the front right wheel 2 is returned to the master cylinder 62 and the reservoir 78 via the pressure holding valve 153FL (that is placed in the open state), pressure increasing mechanism cut-off valve 192 (that is placed in the open state) and communication passage 130. The hydraulic pressure of the brake cylinder 52RR provided for the rear right wheel 48 is returned to the reservoir 78 via the pressure holding valve 153RR, pressure increasing mechanism cut-off valve 192 and pressure increasing mechanism 100. The hydraulic pressure of the brake cylinder 52RL provided for the rear left wheel 46 is returned to the reservoir 78 via the pressure reducing valve 156RL that is placed in the open state.

The pressure holding valve 153RL is constituted by a normally-closed electromagnetic valve, for inhibiting supply of the working fluid from the master cylinder 62 and the pressure increasing mechanism 100 to the brake cylinder 52RL provided for the rear left wheel 46 in the event of failure of the control system (failure of the electric system). Therefore, upon release of the brake operation, the brake cylinder 52RL becomes isolated from the common passage 152 so that the working fluid cannot be returned from the brake cylinder 52RL to the master cylinder 62 via the pressure increasing mechanism 100. However, since the pressure reducing valve 156RL is constituted by a normally-open electromagnetic valve, the working fluid can be returned from the brake cylinder 52RL to the reservoir 78 via the pressure reducing valve 156RL. Further, if all of the pressure reducing valve 156 were constituted by normally-open electromagnetic valves, it would be necessary to keep the electric current supplied to the solenoids during activations of the hydraulic brakes 40, 50, thereby causing a problem of large consumption of electric power. In the present embodiment, since only the pressure reducing valve 156RL among the pressure reducing valves 156 is constituted by a normally-open electromagnetic valve, it is possible to restrain increase of consumption of electric power.

As described above, in the present embodiment, the supply of the hydraulic pressure to the brake cylinders 42, 52 are controlled based on results of the initial checks.

In case of failure of the control system (failure of the electric system), it is possible to supply the hydraulic pressure higher than the hydraulic pressure of the master cylinder 62, to the brake cylinders 42FL, 52RR, by activation of the pressure increasing mechanism 100. Further, the hydraulic pressure of the master cylinder 62 is supplied to the brake cylinder 42FR provided for the front right wheel 4. Thus, in case of failure of the electric system, the hydraulic brakes 40FL, 40FR, 50RR provided for the three wheels can be activated. Consequently, as compared with an arrangement in which the brake cylinders provided for two wheels are activated, it is possible to further satisfactorily avoid insufficiency of the braking force. Further, since the servo pressure is supplied to the brake cylinders for the two wheels located in the respective positions diagonal to each other, it is possible to restrain generation of a yaw moment.

In case of detection of possibility of fluid leakage, the three brake lines 250FL, 250FR, 250R are isolated from one another. Therefore, even if the fluid leakage occurs in any one of the three brake lines 250FL, 250FR, 250R, it is possible to satisfactorily avoid the other brake lines from being influenced by the fluid leakage occurring in the one of the brake lines. Further, the hydraulic brakes can be reliably activated in the brake lines that do not suffer from the fluid leakage.

Further, in the present embodiment, the pressure holding valve 153FL functions as a right/left cut-off valve and each of the pressure holding valves 153FL, 153FR functions as a front/rear cut-off valve, thereby eliminating necessity of provisions of valves serving exclusively as the front/rear cut-off valve and right/left cut-off valve and accordingly making it possible to reduce the cost.

In the hydraulic brake system constructed as described above, a pressure-supply control device is constituted by, for example, portions of the brake ECU 56 which are assigned to store and execute the hydraulic-pressure-supply control program represented by the flow chart of FIG. 5. The pressure-supply control device serves also as an electromagnetic-valve controlling portion. It can be also considered that a communication-cut-off control device is constituted by, for example, by portions of the brake ECU 56 which are assigned to store and implement step S16 of the hydraulic-pressure-supply control program.

Further, an output hydraulic pressure control device is constituted by, for example, the output hydraulic-pressure-control valve device 178 and portions of the brake ECU 56 which are assigned to store and implement steps S14 and S16 of the hydraulic-pressure-supply control program.

Further, the master cylinder passage 74, individual passage 150FL, pressure holding valve 153FL, master-cylinder cut-off valve 194FL and brake cylinder 42FL correspond to a first manual-pressure-source passage, a first individual passage, a first valve, a first manual-pressure-source cut-off valve and a first brake cylinder, respectively. The master cylinder passage 76, individual passage 150FR, pressure holding valve 153FR, master-cylinder cut-off valve 194FR and brake cylinder 42FR correspond to a second manual-pressure-source passage, a second individual passage, a second valve, a second manual-pressure-source cut-off valve and a second brake cylinder, respectively. Further, each of the pressure holding valves 153FL, 153FR, 153RL, 153RR serves also as a pressure-increasing control valve.

Moreover, a pressure supply passage is constituted by, for example, the common passage 152 and individual passage 150.

Further, a fluid-leakage possibility detecting device is constituted by, for example, portions of the brake ECU 56 which are assigned to store and implement step S3 of the initial-check program.

Embodiment 2

Figure 9:
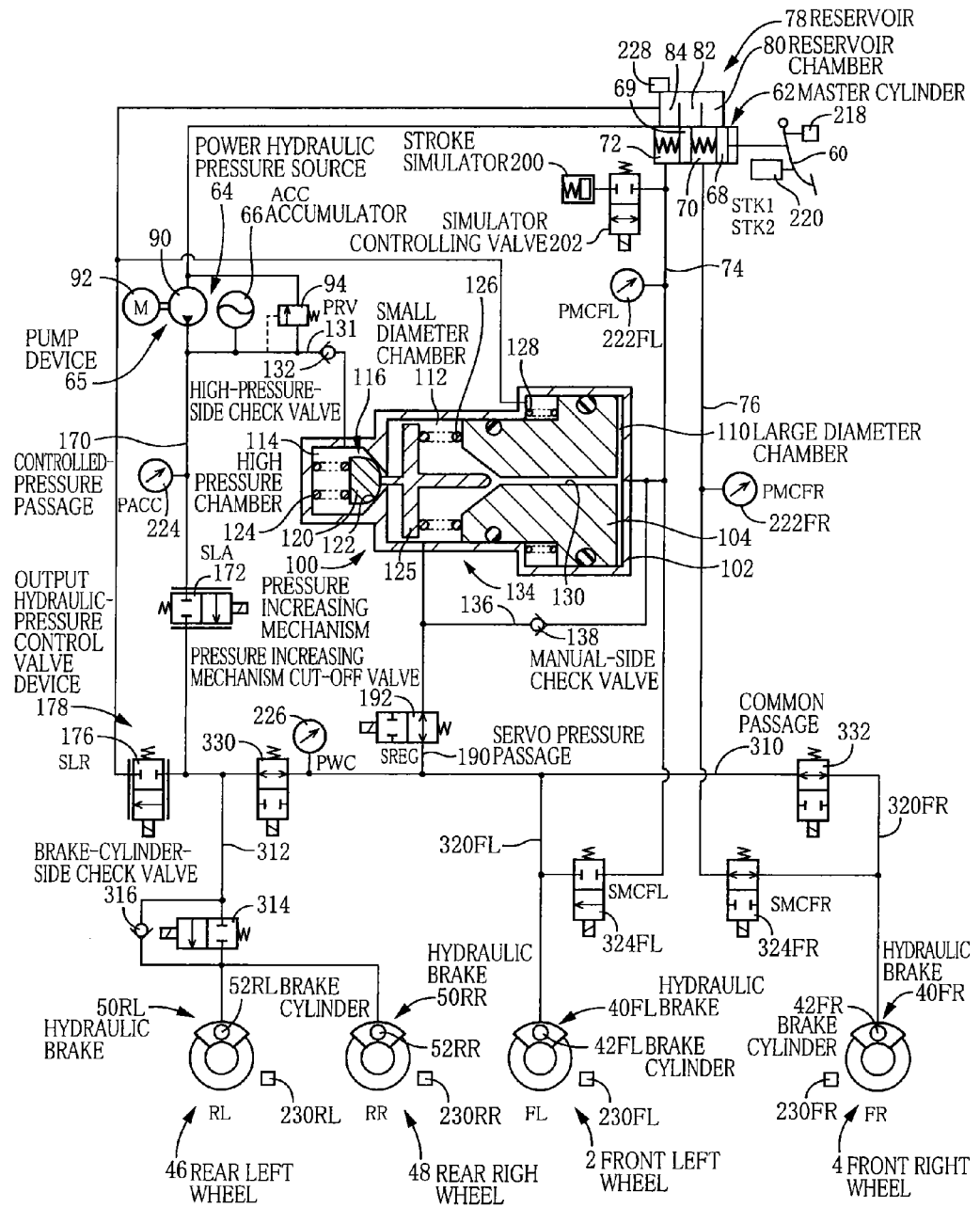
FIG. 9 is a diagram of a hydraulic circuit of the hydraulic brake system according to Embodiment 2 of the present invention.

FIG. 9 shows a diagram of a hydraulic circuit of the hydraulic brake system according to Embodiment 2 of the present invention. In the following description, the same reference sings will be used to identify constructional elements identical with those in the hydraulic circuit of the hydraulic brake system of Embodiment 1, and description of these elements will be omitted. For example, the brake ECU 56 executes controls in the same manners as in Embodiment 1.

In Embodiment 2, the brake cylinders 52RL, 52RR provided for the rear left and right wheels 46, 48 are connected to the common passage 310 via a single individual passage 312, so that the hydraulic pressures in the brake cylinders 52RL, 52RR of the rear left and right wheels 46, 48 are controlled commonly. The individual passage 312 is provided with a common pressure holding valve 314 that is constituted by a normally-closed electromagnetic valve. A brake-cylinder-side check valve 316 is disposed in parallel with the pressure holding valve 314. The check valve 316 allows flow of the working fluid in a direction away from the brake cylinders 52RL, 52RR toward the common passage 310, and inhibits flow of the working fluid in the opposite direction away from the common passage 310 toward the brake cylinders 52RL, 52RR.

Further, the brake cylinders 42FL, 42FR provided for the front left and right wheels 2, 4 are connected to the common passage 310 via respective individual passages 320FL, 320FR each of which is not provided with a pressure holding valve. The master cylinder passages 74, 76 are connected to the respective individual passages 320FL, 320FR, and are provided with respective master-cylinder cut-off valves 324FL, 324FR. The master-cylinder cut-off valve 324FL is constituted by a normally-closed electromagnetic valve while the master-cylinder cut-off valve 324FR is constituted by a normally-open electromagnetic valve.

Further, a front/rear cut-off valve 330 is disposed between a connected portion of the common passage 310 (at which the common passage 310 is connected to the individual passage 312) and a connected portion of the common passage 310 (at which the common passage 310 is connected to the servo pressure passage 190). A right/left cut-off valve 332 is disposed between connected portions of the common passage 310 at which the common passage 310 is connected to the respective individual passages 320FL, 320FR.

Each of the front/rear cut-off valve 330 and right/left cut-off valve 332 is constituted by a normally-open electromagnetic valve.

Although the right/left cut-off valve 332 is disposed in the common passage 310 in the hydraulic brake circuit shown in FIG. 9, this valve 332 may be disposed in a portion of the individual passage 320FL which is located between the master cylinder passage 74 and the common passage 310 or disposed in a portion of the individual passage 320FR which is located between the master cylinder passage 76 and the common passage 310. Further, although the front/rear cut-off valve 330 is disposed between the connected portion of the common passage 310 (at which the common passage 310 is connected to the individual passage 312) and the connected portion of the common passage 310 (at which the common passage 310 is connected to the servo pressure passage 190), this valve 330 may be disposed between a connected portion of the common passage 310 (at which the common passage 310 is connected to the individual passage 320FL) and the connected portion of the common passage 310 (at which the common passage 310 is connected to the servo pressure passage 190).

There will be described activation of the hydraulic brake system that is constructed as described above.

1) In Case of Normality of Hydraulic Brake System

Figure 10:
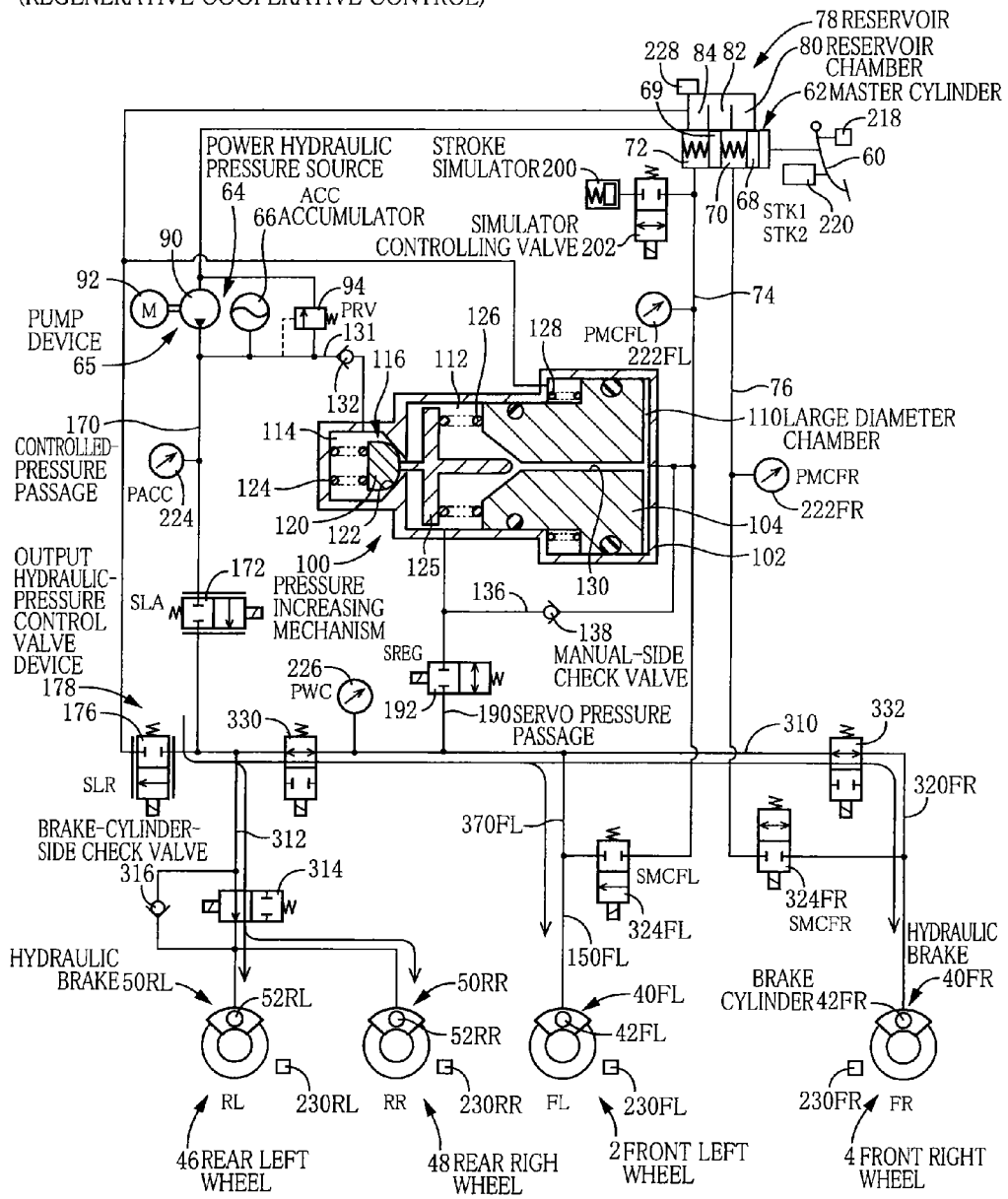
FIG. 10 is a view showing a state upon execution of the hydraulic-pressure-supply control program in the hydraulic brake system (in case of normality of the system).

As shown in FIG. 10, the hydraulic pressure controlled by the output hydraulic-pressure control valve device 178 is supplied to the common passage 310, with the pressure increasing mechanism 100 isolated from the common passage common passage 310 and the brake cylinders 42FL, 42FR of the front left and right wheels 2, 4 isolated from the master cylinder 62.

Further, the pressure holding valve 314 provided for the rear right and left wheels 46, 48 is placed in the open state, and the front/rear cut-off valve 330 and the right/left cut-off valve 332 are placed in the open states, so that the controlled pressure is supplied to all of the brake cylinders 42, 52.

2) In Case of Failure of Control System (In Case of Failure of Electric System)

Figure 11:
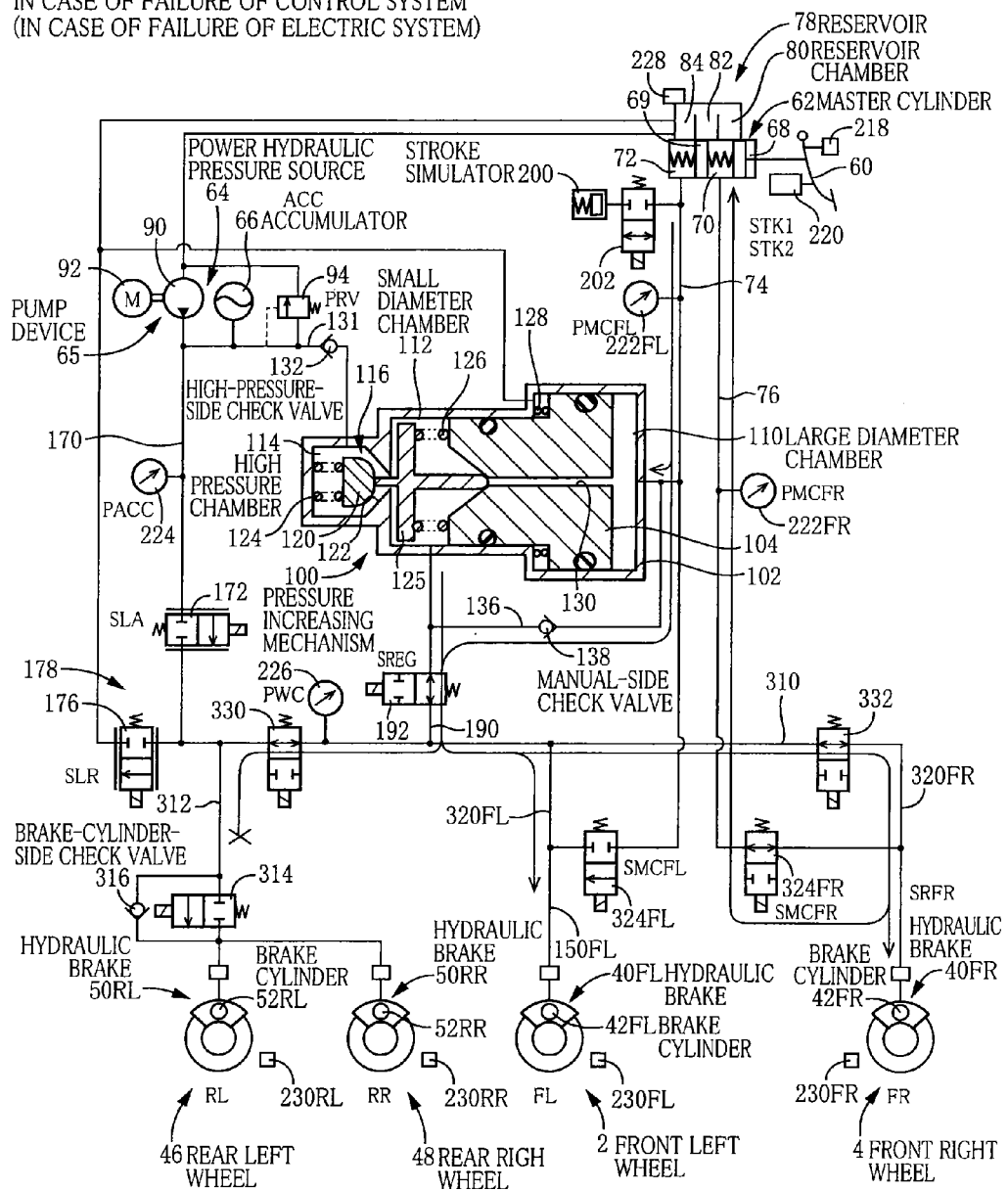
FIG. 11 is a view showing another state upon execution of the hydraulic-pressure-supply control program in the hydraulic brake system (in case of failure of a control system of the brake system).

As shown in FIG. 11, all the electromagnetic valves are placed back in the respective original positions. The servo pressure outputted from the pressure increasing mechanism 100 is supplied to the common passage 310. In this instance, since the pressure holding valve 314 provided for the rear left and right wheels 46, 48 is constituted by the normally-closed electromagnetic valve, the servo pressure is supplied to the brake cylinders 42FL, 42FR provided for the front left and right wheels 2, 4.

Further, since the master-cylinder cut-off valve 324FR is placed in the open state, the hydraulic pressure outputted from the pressure increasing mechanism 100 is supplied to the pressurizing chamber 70 as long as the outputted hydraulic pressure is being higher than the hydraulic pressure of the master cylinder 62. As a result of the supply of the outputted hydraulic pressure to the pressurizing chamber 70, the hydraulic pressure to in the pressurizing chamber 70 is increased whereby the force applied to the pressurizing piston 69 is increased and accordingly the hydraulic pressure in the pressurizing chamber 72 is increased. Thus, the pressure increasing mechanism 100 can be activated by the increased hydraulic pressure whereby the hydraulic pressure outputted from the pressure increasing mechanism 100 can be increased. It is therefore possible to further increase the hydraulic pressures in the brake cylinders 42FL, 42FR of the front left and right wheels 2, 4.

When the pressure of the working fluid stored in the accumulator 66 becomes so low that the hydraulic pressure in the pressurizing chamber 72 becomes higher than the hydraulic pressure outputted from the pressure increasing mechanism 100, the hydraulic pressure in the master cylinder 62 is supplied mainly to the brake cylinder 42FL of the front left wheel 2 via the manual-side check valve 138. Further, the hydraulic pressure in the pressurizing chamber 70 of the master cylinder 62 is supplied to mainly the brake cylinder 42FR of the front right wheel 4. Thus, the hydraulic pressures in the pressurizing chambers 72, 70 are supplied to the respective brake cylinders 42FL, 42FR provided for the respective front left and right wheels 2, 4, whereby the hydraulic brakes 40FL, 40FR can be satisfactorily activated.

Further, since the hydraulic pressures in the brake cylinders 40FL, 40FR of the respective front left and right wheels 2, 4 become substantially equal in magnitude to each other, a yaw moment is unlikely to be generated.

3) In Case of Detection of Possibility of Fluid Leakage

Figure 12:
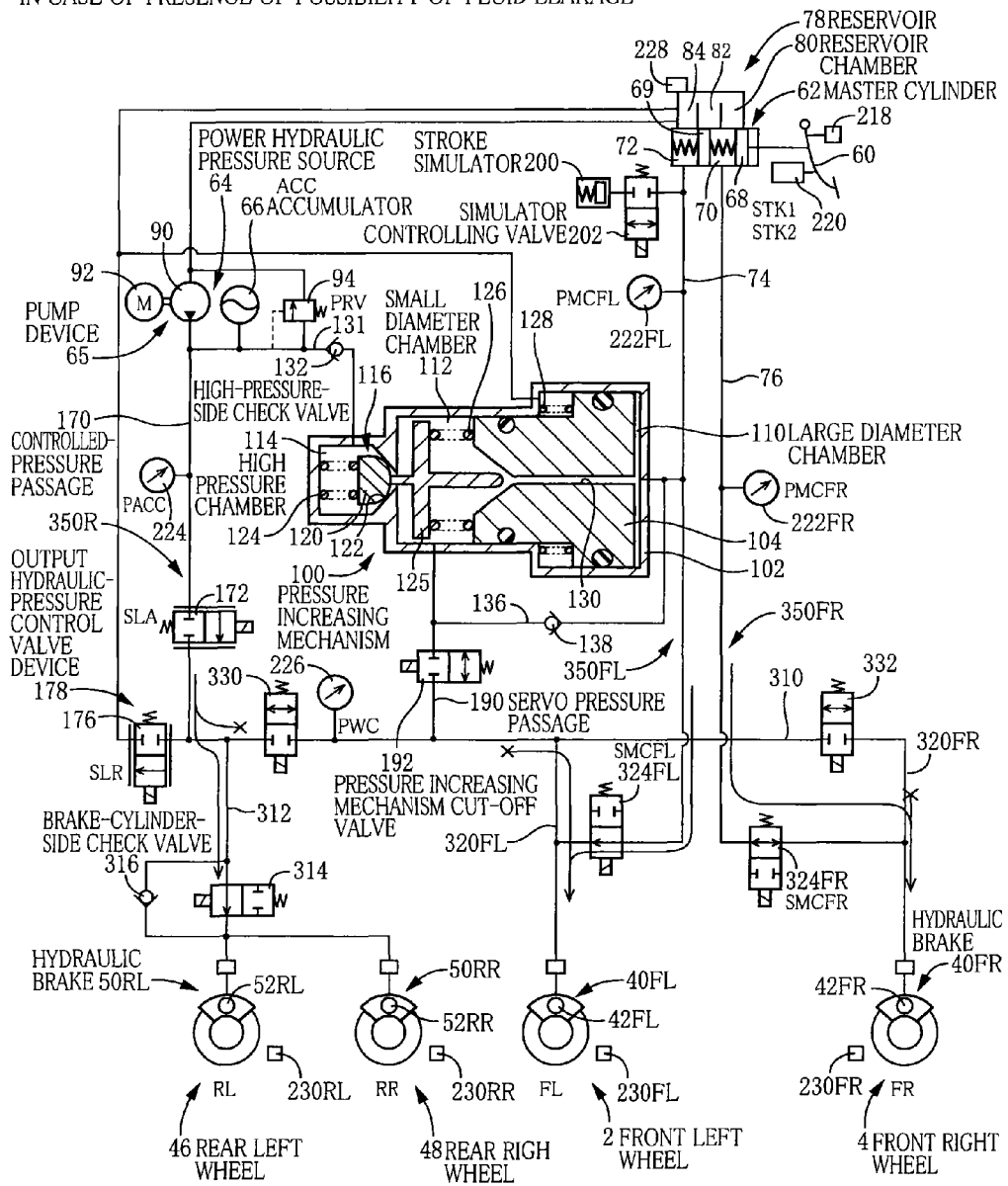
FIG. 12 is a view showing still another state upon execution of the hydraulic-pressure-supply control program in the hydraulic brake system (in case of presence of possibility of fluid leakage).

As shown in FIG. 12, the pressure increasing mechanism cut-off valve 192, right/left cut-off valve 332 and front/rear cut-off valve 330 are placed in the closed states. Further, the pressure holding valve 314 is placed in the open state, and the master-cylinder cut-off valves 324FL, 324FR are placed in the open states.

The hydraulic pressure of the power hydraulic pressure source 64 is controlled and supplied to the brake cylinders 52RL, 52RR provided for the rear left and right wheels 46, 48, while the hydraulic pressure of the master cylinder 62 is supplied to the brake cylinders 42FL, 42FR provided for the front left and right wheels 2, 4. In this instance, since the right/left cut-off valve 332 and front/rear cut-off valve 330 are placed in the closed states, three brake lines, which consist of a brake line 350FL including the brake cylinder 42FL, a brake line 350FR including the brake cylinder 42FR and a brake line 350R including the brake cylinders 52RL, 52RR, are isolated from one another. Therefore, even if one of the three brake lines 350FL, 350FR, 350R suffers from the fluid leakage, the other brake lines are not influenced by the fluid leakage taking place in the one of the three brake lines. Further, the hydraulic brakes can be reliably activated in the brake lines that do not suffer from the fluid leakage.

In the present embodiment, since the right/left cut-off valve 332 is disposed in a portion of the common passage 310 which portion is located between the connected portion of the common passage 310 (at which the common passage 310 is connected to the servo pressure passage 190) and the brake cylinder 42FR of the front right wheel 4, the pressure increasing mechanism cut-off valve 192 does not necessarily have to be placed in the closed state. This is because when the right/left cut-off valve 332 and front/rear cut-off valve 330 are placed in the closed states, the pressure increasing mechanism 100 is in communication with only the brake cylinder 42FL of the front left wheel 2 while being isolated from the other brake lines 350FR, 350R.

4) In Case of Release of Hydraulic Brake

All the electromagnetic valves are placed back in the original positions, as shown in FIG. 9. The working fluid in the brake cylinder 42FR of the front right wheel 4 is returned to the master cylinder 62 via the master cylinder passage 76, while the working fluid in the brake cylinder 42FL of the front left wheel 2 is returned to the master cylinder 62 via the pressure increasing mechanism 100. The working fluid in the brake cylinders 52RL, 52RR of the rear left and right wheels 46, 48 is returned to the master cylinder 62, via the brake-cylinder-side check valve 316, front/rear cut-off valve 330 (that is placed in the open state), common passage 310 and pressure increasing mechanism 100, or via the front/rear cut-off valve 330 (that is placed in the open state), right/left cut-off valve 332 (that is placed in the open state) and master-cylinder cut-off valve 324.

Thus, in the present embodiment, the brake-cylinder-side check valve 316 is disposed in parallel with the pressure holding valve 314 which is provided for the rear wheels 46, 48 and which is constituted by the normally-closed electromagnetic valve. Therefore, by inhibiting the working fluid from being supplied to the brake cylinders 52 of the rear wheels 46, 48 in the event of failure of the electric system, it is possible to assure the braking force and to cause the working fluid to be reliably returned from the brake cylinders 52 of the rear wheels 46, 48 upon release of the hydraulic brake.

In the present embodiment, the individual passage 312 corresponds to a third individual passage, and the pressure holding valve 314 corresponds to a third valve.

The pressure holding valve 314 may be adapted to function as a brake-side check valve. The pressure holding valve 314 is constituted by the normally-closed electromagnetic valve, and has the same construction as the pressure-increasing linear control valve 172 and pressure-reducing linear control valve 176 that are shown in FIG. 3. When the electric current is not being supplied to the solenoid of the valve 314 with the valve 314 placed in the closed state, the pressure-difference-based force F3 and the biasing force F2 act on the valve body of the valve 314, wherein the pressure-difference-based force F3 is generated based on a difference between input and output sides of the valve 314, and the biasing force F2 is generated by the spring of the valve 314. Where the spring force of the valve 314 is adapted to generate a small force as the biasing force F2, the valve 314 can be switched from the closed state to the open state, when the hydraulic pressure in the brake cylinder 52 becomes higher than the hydraulic pressure in the common passage 310 so that the pressure-difference-based force F3 becomes larger than the biasing force F2. Thus, by adapting the spring of the valve 314 to generate the small biasing force, it is possible to eliminate necessity of provision of the brake-cylinder-side check valve 316 and accordingly to further reduce the cost.

Embodiment 3

In the hydraulic brake system constructed according to Embodiment 2, the electromagnetic valves are controlled to be placed in the respective positions shown in FIG. 12 when the possibility of fluid leakage is detected. However, the valves may be controlled in a different manner.

There will be described how the right/left cut-off valve 332 and front/rear cut-off valve 330 are controlled upon detection of possibility of presence of fluid leakage in a brake system including a hydraulic brake system that is the same as that in Embodiment 2.

It is preferable that the right/left cut-off valve 332 and front/rear cut-off valve 330 are held in the closed states as long as possible when the presence of possibility of fluid leakage is detected. The fluid leakage does not necessarily occur even when the presence of possibility of fluid leakage is detected. However, it is preferable that, when one of the brake lines actually suffers from the fluid leakage, the other brake lines are not influenced by the fluid leakage taking place in the one of the three brake lines. Since the right/left cut-off valve 332 and front/rear cut-off valve 330 are constituted by normally-open electromagnetic valves, it is necessary to keep supplying electric current to their solenoids for keeping them in the closed states. When the supply of the electric current is made for a large length of time, there could be problems such as increase of consumption of the electric power and an excessive heating of the solenoids.

On the other hand, as long as the hydraulic pressure is not applied to the brake lines 350FL, 350FR, 350R, even if the fluid leakage actually takes place in one of the brake lines, the working fluid flows little out from the brake line that suffers from the fluid leakage so that the other brake lines are influenced little by the fluid leakage.

In view of the above, in Embodiment 2, upon detection of presence of the possibility of fluid leakage, the right/left cut-off valve 332 and the front/rear cut-off valve 330 are, in principle, held in the closed states, and are placed in the open state by turning OFF the electric current supplied to the solenoids when a predetermined valve-open allowing condition is satisfied (namely, when it is not problematic that the cut-off valves 332, 330 are placed in the open states).

In other words, even upon detection of presence of the possibility of fluid leakage, the cut-off valves 332, 330 are placed in the closed states by turning ON the electric current supplied to the solenoids, only when the valves 332, 330 are really required to be placed in the closes states (namely, only when a predetermined valve-closed allowing condition is satisfied). Thus, it is possible to prevent the solenoids from being excessively heated and accordingly to reduce consumption of the electric power.

Figure 13:
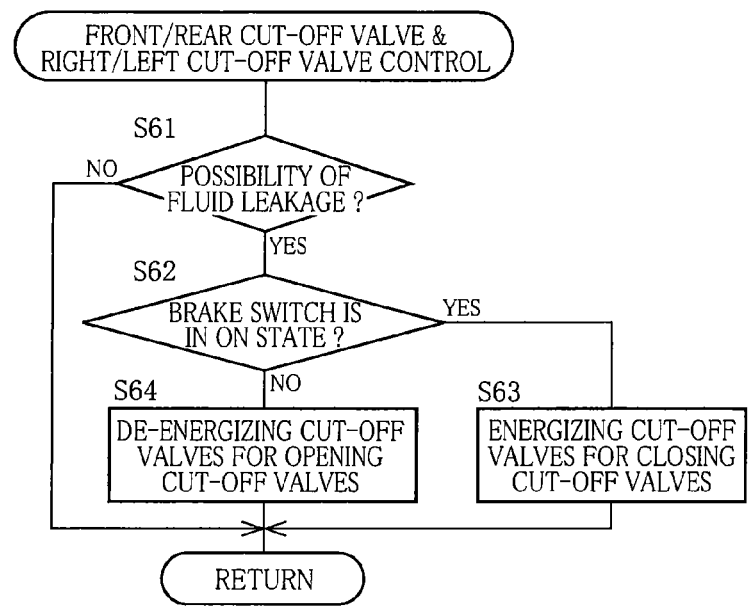
FIG. 13 is a flow chart representing a front/rear cut-off valve & right/left cut-off valve control program stored in the memory portion of the brake ECU that is included in the hydraulic brake system.

A) The right/left cut-off valve 332 and the front/rear cut-off valve 330 can be controlled in accordance with a front/rear cut-off valve & right/left cut-off valve control program which is represented by a flow chart of FIG. 13 and which is executed at a predetermined time interval.

This control program is initiated with step S61 that is implemented to read result of detection of presence of possibility of fluid leakage. When there is a possibility of fluid leakage, step S62 is implemented to judge whether the brake switch 218 is in the ON state. When the brake switch 218 is in the ON state, the control flow goes to step S63 in which the right/left cut-off valve 332 and front/rear cut-off valve 330 are placed in the closed states. When the brake switch 218 is placed in the OFF state, the control flow goes to step S64 in which the cut-off valves 332, 330 are placed in the open states without supply of the electric current to the solenoids. When the brake switch 218 is switched from the OFF state to the ON state, the cut-off valves 332, 330 are switched from the open states to the closed states.

During activations of the hydraulic brakes 40, 50 in the ON state of the brake switch 218, it is preferable that the right/left cut-off valve 332 and the front/rear cut-off valve 330 are placed in the closed states while the three brake lines 350FL, 350FR, 350R are isolated from one another so that, as in Embodiment 2, the hydraulic pressure controlled by the output hydraulic-pressure control valve device 178 can be supplied to the brake cylinders 52RL, 52RR provided for the rear left and right wheels 46, 48 while the hydraulic pressure of the master cylinder 62 can be supplied to the brake cylinders 42FL, 42FR provided for the front left and right wheels 2, 4.

Where a regenerative cooperative control is inhibited from being executed upon detection of presence of the possibility of fluid leakage, it is considered that the hydraulic brakes 40, 50 are being activated when the brake switch 218 is in the ON state.

In each of the right/left cut-off valve 332 and front/rear cut-off valve 330, the heating of the solenoid can be retrained, for example, by increasing number of turns of coil in the solenoid and/or by controlling the electric current supplied to the solenoid.

During inactivations of the hydraulic brakes 40, 50 in the OFF state of the brake switch 218, the other brake lines are influenced little by the fluid leakage even if the right/left cut-off valve 332 and front/rear cut-off valve 330 are placed in the open states. Therefore, when the brake switch 218 is placed in the OFF state, the electric current supplied to the solenoids of the cut-off valves 332, 330 is turned OFF whereby the valves 332, 330 are placed in the open states. Thus, it is possible to reduce consumption of the electric power and to restrain heating of the solenoids.

When there is no possibility of fluid leakage, a negative judgment (NO) is obtained in step S61 so that steps S63 and S64 are not implemented. That is, when there is no possibility of fluid leakage, the right/left cut-off valve 332 and the front/rear cut-off valve 330 are not controlled in accordance with this front/rear cut-off valve & right/left cut-off valve control program but are controlled in accordance with other program such as the hydraulic-pressure-supply control program.

Therefore, when it is judged that there is no possibility of fluid leakage, it is common that the cut-off valves 332, 330 are placed back into the open states, but they are not necessarily placed back into the open states immediately. For example, in a vehicle stability control or a traction control, the right/left cut-off valve 332 is placed in the closed state when the hydraulic pressure controlled by the output hydraulic-pressure control valve device 178 is to be supplied only to the brake cylinder 42FL of the front left wheel 2.

It is noted that step S62 may be implemented by judging whether the hydraulic pressure detected by the brake-cylinder pressure sensor 226 is equal to or higher than a judgment threshold value, which is a value determined such that it can be regarded that the hydraulic brakes 40, 50 are being activated when the detected hydraulic pressure is not lower than this judgment threshold value. With step S62 being thus implemented, the right/left cut-off valve 332 and the front/rear cut-off valve 330 can be placed in the closed states, for example, also when the automatic brake is being activated upon detection of presence of the possibility of fluid leakage.

Further, the detection as to whether there is the possibility of fluid leakage may be made not only when the initial check is carried out but also when it is required. That is, the detection as to whether there is the possibility of fluid leakage may be made in step S61.

A communication-cut-off control device is constituted by, for example, portions of the brake ECU 56 which are assigned to store and execute the front/rear cut-off valve & right/left cut-off valve control program shown in FIG. 13. The portions of the brake ECU 56 include portions which are assigned to store and implement steps S62 and S63 and which cooperate to constitute an electromagnetic-valve closing control portion. The portions of the brake ECU 56 further include portions which are assigned to store and implement steps S62 and S64 and which cooperate to constitute an electromagnetic-valve opening control portion. The electromagnetic-valve closing control portion serves also as an operation-based closing control portion.

Further, the right/left cut-off valve 332 corresponds to a first communication shut-off valve while the front/rear cut-off valve 330 corresponds to a second communication shut-off valve.

It can be also considered that the electromagnetic-valve closing control portion corresponds to an electromagnetic-valve closing hold portion and that the electromagnetic-valve opening control portion corresponds to an electromagnetic-valve compulsorily opening control portion.

Figure 14:
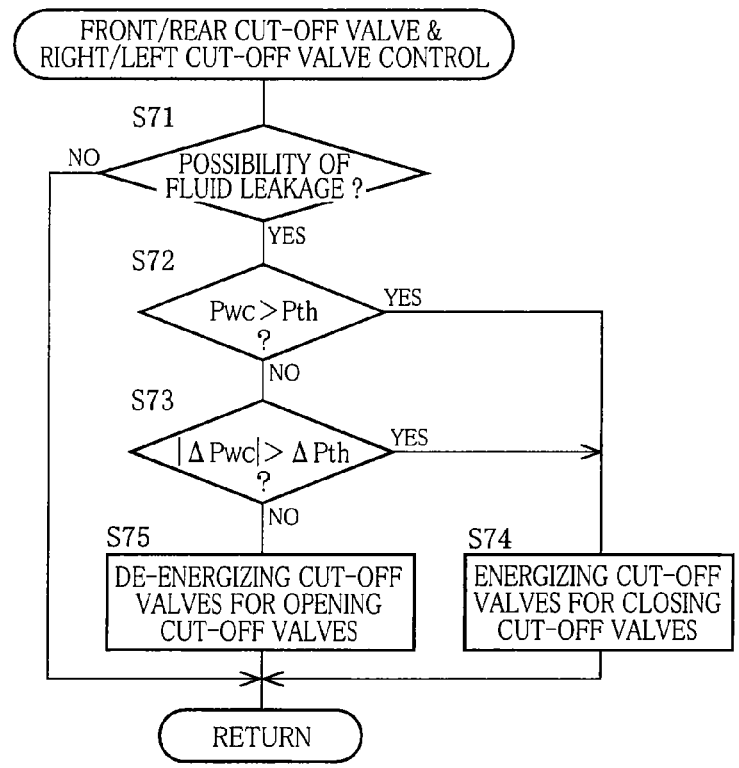
FIG. 14 is a flow chart representing a front/rear cut-off valve & right/left cut-off valve control program stored in the memory portion of the brake ECU that is included in a hydraulic brake system according to Embodiment 3 of the present invention.

B) The right/left cut-off valve 332 and the front/rear cut-off valve 330 can be controlled also in accordance with a control program which is represented by a flow chart of FIG. 14.

This control program is initiated with step S71 that is implemented to read result of detection of presence of possibility of fluid leakage. When there is a possibility of fluid leakage, steps S72 and S73 are implemented to judge whether at least one of the hydraulic pressures in the respective brake cylinders 42, 52 is higher than a given pressure value and to judge whether an absolute value of rate of change of at least one of the hydraulic pressures in the respective brake cylinders 42, 52 is higher than a given rate value. When a positive judgment (YES) is obtained in at least one of steps S72 and S73, step S74 is implemented to place the cut-off valves 332, 330 into the closed states. When a negative judgment (NO) is obtained in each of steps S72 and S73, step S75 is implemented to placed the cut-off valves 332, 330 into the open states.

The above-described given pressure value may be a value determined such that it can be regarded that, in the event of fluid leakage, the working fluid is caused to leak out from a leakage part (e.g., a part deteriorated in sealing performance) by at least a given amount and accordingly the influence affecting the other brake lines becomes problematic when the hydraulic pressure in the brake cylinder is higher than the given pressure value. In this sense, the given pressure value may be referred to as an influence-based judgment threshold value.

The given pressure value may be higher than a pressure value (activation-judgment threshold value) determined such that it can be regarded that the hydraulic brakes 42, 52 are being activated when the hydraulic pressures in the brake cylinders are higher than the activation-judgment threshold value. In other words, even during activations of the hydraulic brakes 42, 52, when the hydraulic pressures in the brake cylinders 42, 52 are low, the amount of fluid leakage is so small that the influence by the fluid leakage is small, and accordingly it is not problematic that the cut-off valves 332, 330 are placed in the open states. However, when the hydraulic pressures are high, the influence by the fluid leakage is large so that it is considered that the cut-off valves 332, 330 are highly required to be placed in the closed states.

When the absolute value of rate of change of the hydraulic pressure in each of the brake cylinders 42, 52 is larger than the given rate value, it is considered that the amount of fluid leakage becomes large. Further, when the rate of increase of the brake cylinder pressure is high, it can be considered that there is a high possibility that the brake cylinder pressure becomes high. Therefore, when the absolute value of rate of change of the brake cylinder pressure is large, it is preferable that the right/left cut-off valve 332 and the front/rear cut-off valve 330 are placed in the closed states.

Further, when the right/left cut-off valve 332 and the front/rear cut-off valve 330 are placed in the open states, it is preferable that the master-cylinder cut-off valves 324FL, 34FR are placed in the closed states.

In the present embodiment, a hydraulic-pressure-based closing control portion is constituted by, for example, portions of the brake ECU 56 which are assigned to store and implement steps S72, S73 and S74.

It is noted that step S73 may be implemented by judging whether there is a high possibility that the absolute value of rate of change of the brake cylinder pressure becomes larger than the given rate value. For example, when there is a high possibility that the brake pedal 60 is to be operated, it can be considered that there is a high possibility that the rate of increase of the brake cylinder pressure becomes higher than the given rate value.

Figure 15:
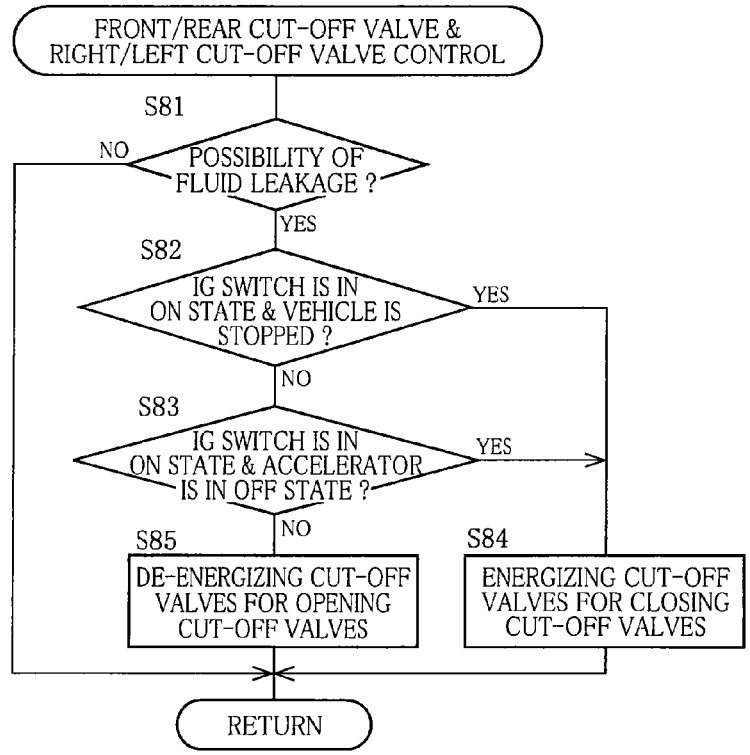
FIG. 15 is a flow chart representing another front/rear cut-off valve & right/left cut-off valve control program stored in the memory portion of the brake ECU.

C) The right/left cut-off valve 332 and the front/rear cut-off valve 330 can be controlled also in accordance with a control program which is represented by a flow chart of FIG. 15.

When there is a possibility of fluid leakage, steps S82 and S83 are implemented to judge whether a running velocity of the vehicle is equal to or lower than a given velocity value with the ignition switch 234 being placed in the ON state and to judge whether the acceleration switch 234 is placed in the OFF state with the ignition switch 234 being placed in the ON state. The given velocity value is a value determined such that it can be regarded that the vehicle is being stopped when the running velocity is not higher than the given velocity value. When a positive judgment (YES) is obtained in at least one of steps S82 and S83, step S84 is implemented to place the cut-off valves 332, 330 into the closed states. When a negative judgment (NO) is obtained in each of steps S82 and S83, step S85 is implemented to placed the cut-off valves 332, 330 into the open states. When the ignition switch 234 is placed in the OFF state, or when the accelerator pedal is being operated during running of the vehicle with the ignition switch 234 placed in the ON state, it is not considered problematic that the cut-off valves 332, 330 are placed in the open states since there is not a high possibility that the brake pedal 60 is to be operated in such a case.

When the running velocity of the vehicle is not higher than the given velocity value or when the accelerator pedal is not being operated, it is preferable that the cut-off valves 332, 330 are placed in the closed states since there is a high possibility that the brake pedal 60 is to be operated in such a case. During operation of the brake pedal 60, the rate of increase of the hydraulic pressure in each of the brake cylinders 42 52 becomes high so that the other brake lines are influenced much by the fluid leakage. Therefore, it is preferable to place the cut-off valves 332, 330 into the closed states before the operation of the brake pedal 60 is actually started.

When the brake pedal 60 is being actually operated, the accelerator switch 324 is placed in the OFF state so that a negative judgment (NO) is obtained in step S83 and step S84 is implemented to place the right/left cut-off valve 332 and the front/rear cut-off valve 330 into the closed states.

In the present embodiment, a vehicle-stop closing control portion is constituted by, for example, portions of the brake ECU 56 which are assigned to store and implement steps S82 and S84, and an operation-based closing control portion is constituted by, for example, portions of the brake ECU 56 which are assigned to store steps S82 through S84.

Since the right/left cut-off valve 332 and the front/rear cut-off valve 330 are placed in the closed states also after the brake pedal 60 has been released, it is preferable to place the pressure-reducing linear control valve 176 in the open state for a given length of time after release of the brake pedal 60, so as to cause the hydraulic pressures of the brake cylinders 52RL, 52RR of the rear wheels 46, 48 to be returned to the reservoir 78 via the pressure-reducing linear control valve 176.

Figure 16:
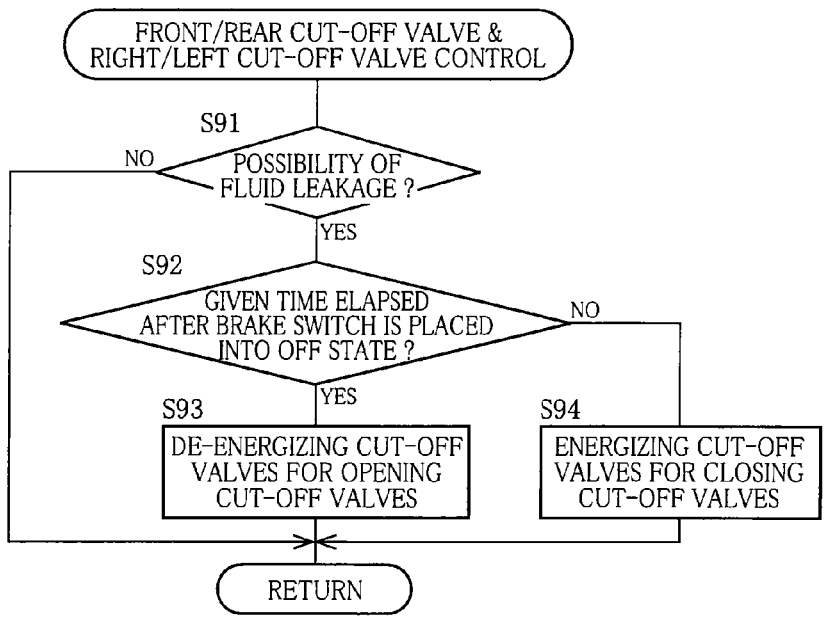
FIG. 16 is a flow chart representing still another front/rear cut-off valve & right/left cut-off valve control program stored in the memory portion of the brake ECU.

D) The right/left cut-off valve 332 and the front/rear cut-off valve 330 can be controlled also in accordance with a control program which is represented by a flow chart of FIG. 16. In the present embodiment, when fluid leakage is detected, the cut-off valves 332, 330 are, in principle, held in the closed states, but are placed in the open states for a given length time after the brake switch 218 has been placed from the ON state to the OFF state because there is not a high possibility that the brake operation is carried out again with the given length time after release of the brake pedal. It is noted that the given length of time is a length of time determined such that it can be thought that the brake operation is unlikely to be performed within the given length of time.

Step S91 is implemented to detect whether there is a possibility of fluid leakage. When presence of the possibility of fluid leakage is detected, step S92 is implemented to judge whether a given length of time (e.g., about two seconds) has elapsed after the brake switch 218 has been switched from the ON state to the OFF state. Until the given length of time has elapsed, step S93 is implemented to keep the cut-off valves 332, 330 in the open states. When the given length of time has elapsed, step S94 is implemented to place the cut-off valves 332, 330 into the closed states. That is, even during the OFF state of the brake switch 218, the cut-off valves 332, 330 are placed in the closed states, and held in the closed states irrespective of whether the ignition switch 234 is placed in the ON or OFF state.

In the present embodiment, an electromagnetic-valve closing hold portion is constituted by, for example, portions of the brake ECU 56 which are assigned to store and implement steps S91, S92 and S94, and an electromagnetic-valve compulsorily opening control portion is constituted by, for example, portions of the brake ECU 56 which are assigned to store and implement steps S92 and S93. Further, it can be considered that an operation-based closing control portion is constituted by, for example, the portions of the brake ECU 56 which are assigned to store and implement steps S92 and S93.

Figure 17:
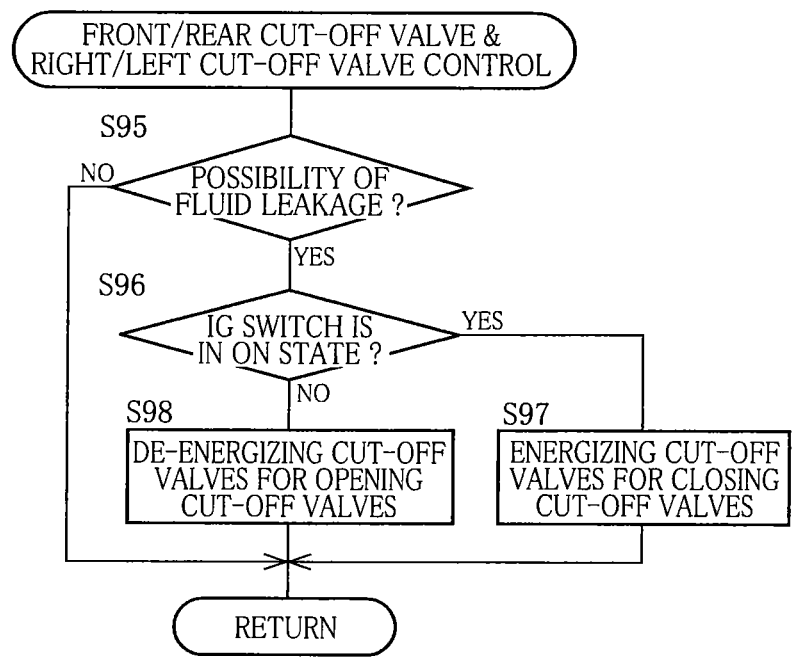
FIG. 17 is a flow chart representing still another front/rear cut-off valve & right/left cut-off valve control program stored in the memory portion of the brake ECU.

E) The right/left cut-off valve 332 and the front/rear cut-off valve 330 can be controlled also in accordance with a control program which is represented by a flow chart of FIG. 17. In the present embodiment, in case of detection of fluid leakage, the cut-off valves 332, 330 are held in closed states when the ignition switch 234 is placed in the ON state, and are held in the open states when the ignition switch 234 is placed in the OFF state.

Step S95 is implemented to detect whether there is a possibility of fluid leakage. When presence of the possibility of fluid leakage is detected, step S96 is implemented to judge whether the ignition switch 234 is placed in the ON state. When the ignition switch 234 is placed in the ON state, step S97 is implemented to place the cut-off valves 332, 330 in the closed states. When the ignition switch 234 is placed in the OFF state, step S98 is implemented to place the cut-off valves 332, 330 in the open states.

In the present embodiment, a switch-ON closing control portion is constituted by, for example, portions of the brake ECU 56 which are assigned to store and implement steps S96 and S97.

It is noted that the right/left cut-off valve 332 and the front/rear cut-off valve 330 may be always held in closed states irrespective of whether the ignition switch 234 is in the ON or OFF state.

Further, when the brake switch 218 is placed in the OFF state with the right/left cut-off valve 332 and front/rear cut-off valve 330 being held in the closed states over a predetermined maximum length of time (that is allowable for preventing heat generation), the cut-off valves 332, 330 may be held in the open states for a predetermined length of time for cooling the solenoids, so that it is possible to satisfactorily restrain heating of the solenoids and to reduce consumption of the electric power.

Moreover, the right/left cut-off valve 332 and the front/rear cut-off valve 330 may be controlled also in accordance with combination of a part or all of at least two of the above-described five control programs.

Further, the right/left cut-off valve 332 and the front/rear cut-off valve 330 may be controlled in accordance with respective programs that are other than each other. Further, the right/left cut-off valve 332 and the front/rear cut-off valve 330 may be alternately placed in the open state when a predetermined condition or conditions are satisfied.

Embodiment 4

Figure 18:
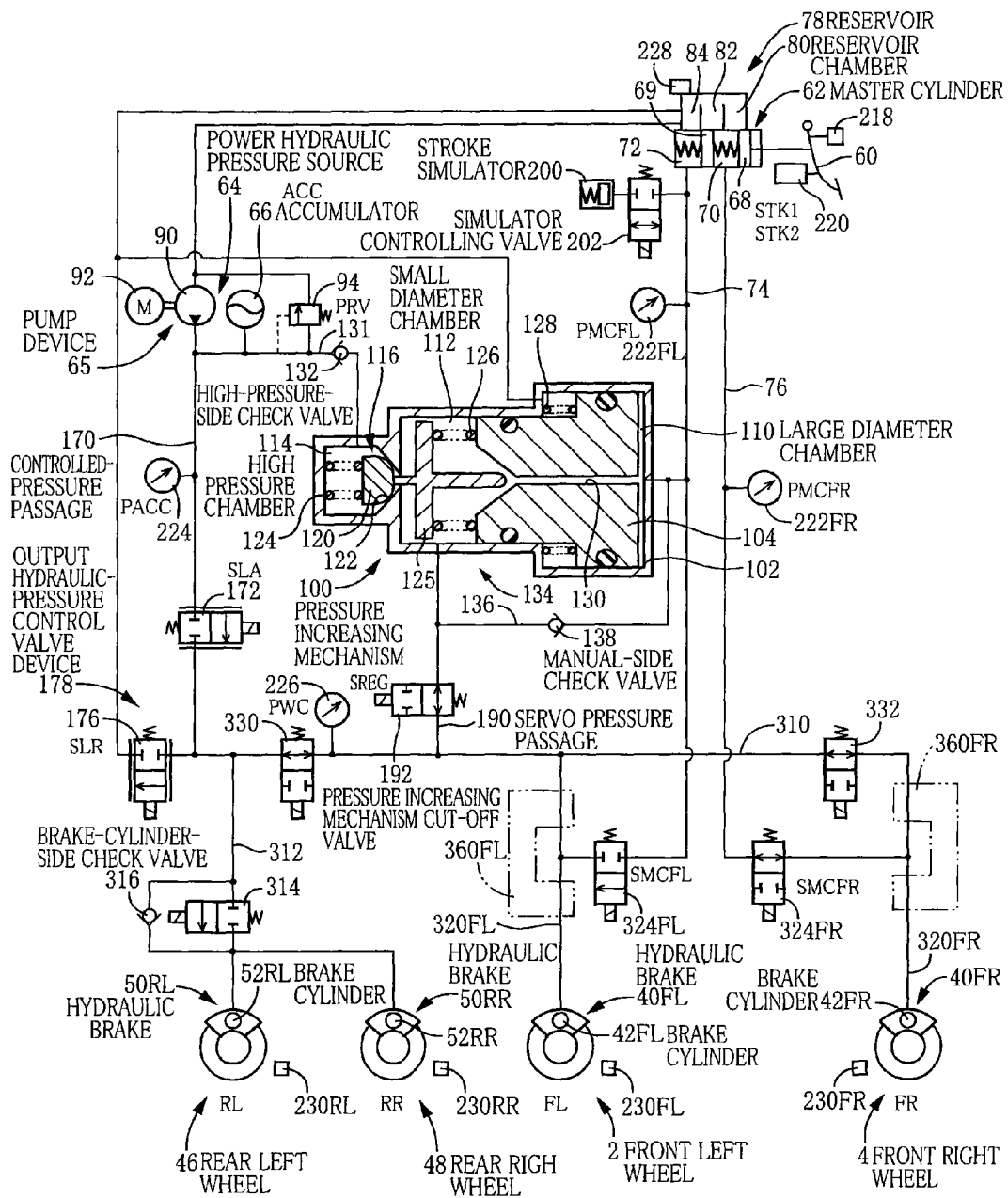
FIG. 18 is a diagram of a hydraulic circuit of a hydraulic brake system according to Embodiment 4 of the present invention.

The brake circuit may be constructed as shown in FIG. 18.

In the brake circuit according to the present embodiment, each of individual hydraulic-pressure control portions 360FL, 360FR is disposed on a midway of a corresponding one of the individual passages 320FL, 320FR provided for the respective front left and right wheels 2, 4, so as to control the hydraulic pressure in a corresponding one of the brake cylinders 42FL, 42FR. Each of the individual hydraulic-pressure control portions 360FL, 360FR may be constituted by at least one electromagnetic valve such as the pressure holding valve 153 and pressure reducing valve 156 included in the hydraulic brake system of Embodiment 1, or the pressure-increasing linear control valve 172 and pressure-reducing linear control valve 176 included in the hydraulic brake system of Embodiment 1. With provisions of the individual hydraulic-pressure control portions 360FL, 360FR, it is possible to finely control the hydraulic pressures in the brake cylinders 42FL, 42FR.

It is noted that the pressure increasing mechanism 100 and the output hydraulic-pressure control valve device 178 are not essential. Further, the power hydraulic pressure source 64 may be employed exclusively to activate the pressure increasing mechanism 100.

Further, the present invention can be carried out also in modes in which two or more of Embodiments 1, 2 and 3 are combined. For example, in a mode in which Embodiments 1 and 2 are combined, the brake hydraulic pressure circuit may be construed such that (i) the pressure holding valves 153FL, 153FR and the pressure reducing valves 156FL, 156FR are provided for the brake cylinders 42FL, 42FR of the front left and right wheels while the pressure holding valve 314 is provided commonly for the brake cylinders 52RL, 52RR of the rear left and right wheels or (ii) the pressure holding valve 332 is provided for the brake cylinder 42FR of the front right wheel while the pressure holding valves 153RL, 153RR and the pressure reducing valves 156RL, 156RR are provided for the brake cylinders 52RL, 52RR of the rear left and right wheels. Further, the controls executed in Embodiment 3 may be applied to the brake hydraulic pressure circuit of Embodiment 1. In this case, both of the pressure holding valves 153FL, 153FR or the normally-open pressure holding valve 153FR is subjected to the controls.

Moreover, the present invention can be carried out in not only the above-described modes but also in other modes of various modifications and improvements that will be made based on knowledge of a person skilled in the art.

DESCRIPTION OF REFERENCE SIGNS

40, 50: hydraulic brake 42, 52: brake cylinder 54: hydraulic-pressure controlling portion 56: brake ECU 60: brake pedal 62: master cylinder 64: power hydraulic pressure source 66: accumulator 70, 72: pressurizing chamber 74, 76: master cylinder passage 100: pressure increasing mechanism 104: stepped piston 110: large diameter chamber 112: small diameter chamber 132: high-pressure-side check valve 138: manual-side check valve 134: mechanical pressure-increasing device 150: individual passage 152: common passage 153: pressure holding valve 156: pressure reducing valve 170: controlled-pressure passage 172: pressure-increasing linear control valve 176: pressure-reducing linear control valve 178: output hydraulic-pressure control valve device 190: servo pressure passage 192: pressure increasing mechanism cut-off valve 218: brake switch 220: stroke sensor 222: master-cylinder pressure sensor 224: accumulator pressure sensor 226: brake-cylinder pressure sensor 228: level warning 230: wheel velocity sensor

The invention claimed is:

1. A brake system comprising:
   a plurality of hydraulic brakes provided for respective wheels of a vehicle, and configured to be activated by hydraulic pressures of respective brake cylinders thereof so as to restrain rotations of the respective wheels;
   a manual hydraulic pressure source which is configured to generate hydraulic pressure by operation of a brake operating member by an operator;
   a power hydraulic pressure source which is configured to generate hydraulic pressure by supply of electric energy thereto;
   a high pressure generator which is configured to generate hydraulic pressure that is higher than the hydraulic pressure of said manual hydraulic pressure source, by utilizing the hydraulic pressure of said power hydraulic pressure source;

a common passage to which a first brake cylinder, a second brake cylinder and said high pressure generator are connected, said first brake cylinder being one of said brake cylinders of said hydraulic brakes and being connected to said common passage via a first individual passage, said second brake cylinder being one of said brake cylinders that is other than said first brake cylinder and being connected to said common passage via a second individual passage that is other than said first individual passage;

a high-pressure-generator cut-off valve disposed between said common passage and said high pressure generator;

a first manual-pressure-source passage connecting said first individual passage and said manual hydraulic pressure source;

a first manual-pressure-source cut-off valve provided in said first manual-pressure-source passage;

a first valve provided in a portion of a pressure supply passage which is located between a connected portion of said pressure supply passage and said second brake cylinder, said pressure supply passage including said first individual passage, second individual passage and common passage, said pressure supply passage being connected at said connected portion thereof to said first manual-pressure-source passage; and a pressure-supply control device configured to control supply of the hydraulic pressure to each of said first and second brake cylinders, by controlling at least said high-pressure-generator cut-off valve, first valve and first manual-pressure-source cut-off valve.

2. The brake system according to claim 1, wherein said pressure-supply control device includes an electromagnetic-valve controlling portion configured to control said high-pressure-generator cut-off valve, first valve and first manual-pressure-source cut-off valve, so as to establish a first state and a second state, such that the hydraulic pressure of said high pressure generator is supplied to said first brake cylinder and second brake cylinder by placing said high-pressure-generator cut-off valve and first valve first valve in open states and placing said first manual-pressure-source cut-off valve in a closed state when said first state is established, and such that the hydraulic pressure of said manual hydraulic pressure source is supplied to said first brake cylinder with said first brake cylinder being isolated from said high pressure generator and said second brake cylinder by placing said high-pressure-generator cut-off valve and first valve in closed states and placing said first manual-pressure-source cut-off valve in an open state.

3. The brake system according to claim 1,
wherein each of said high-pressure-generator cut-off valve and said first valve is constituted by a normally-open electromagnetic valve that is to be placed in an open state when electric current is not being supplied to a solenoid thereof,
and wherein said first manual-pressure-source cut-off valve is constituted by a normally-closed electromagnetic valve that is to be placed in a closed state when electric current is not being supplied to a solenoid thereof.

4. The brake system according to claim 1, comprising first and second manual hydraulic pressure sources and a second manual-pressure-source cut-off valve,
wherein said first valve is provided in a portion of said pressure supply passage which is located between a high-pressure-generator connected portion of said pressure supply passage and said second brake cylinder, said pressure supply passage being connected at said high-pressure-generator connected portion thereof to said high pressure generator,
wherein said first manual hydraulic pressure source is connected to said first brake cylinder via said first manual-pressure-source passage, while said second manual hydraulic pressure source is connected to said second brake cylinder via a second manual-pressure-source passage that is other than said first manual-pressure-source passage,
and wherein said second manual-pressure-source cut-off valve is provided in said second manual-pressure-source passage.

5. The brake system according to claim 1, comprising first and second manual hydraulic pressure sources,
wherein said first manual hydraulic pressure source is connected to said first brake cylinder via said first manual-pressure-source passage,
wherein said second manual hydraulic pressure source is connected to said second brake cylinder via a second manual-pressure-source passage that is other than said first manual-pressure-source passage,
wherein said first valve is provided in a portion of said pressure supply passage which is located between said connected portion of said pressure supply passage and a high-pressure-generator connected portion of said pressure supply passage, said pressure supply passage being connected at said high-pressure-generator connected portion thereof to said high pressure generator,
said brake system comprising:
a second manual-pressure-source cut-off valve provided in said second manual-pressure-source passage; and
a second valve provided in a portion of said pressure supply passage which is located between said high-pressure-generator connected portion of said pressure supply passage and a second-manual-pressure-source-passage connected portion of said pressure supply passage, said pressure supply passage being connected at said second-manual-pressure-source-passage connected portion thereof to said second manual-pressure-source passage.

6. The brake system according to claim 5,
wherein said second valve is constituted by a normally-closed electromagnetic valve that is to be placed in a closed state when electric current is not being supplied to a solenoid thereof,
and wherein said second manual-pressure-source cut-off valve is constituted by a normally-open electromagnetic valve that is to be placed in an open state when electric current is not being supplied to a solenoid thereof.

7. The brake system according to claim 5,
wherein said hydraulic brakes are provided for respective front right, front left, rear right and rear left wheels of the vehicle that constitute two pairs of wheels, each pair of the two pairs of wheels being constituted by two of the wheels located in respective positions that are diagonal to each other,
wherein said brake cylinders of said hydraulic brakes are connected to said common passage via respective individual passages,
wherein each of two of said individual passages, which are connected to respective two of said brake cylinders provided for respective two of the wheels that constitute one pair of the two pairs of wheels, is provided with a pressure-increasing control valve constituted by a normally-open electromagnetic valve that is to be placed in an open state when electric current is not being supplied to a solenoid thereof, and wherein each of two of said individual passages, which are connected to respective two of said brake cylinders provided for respective two of the wheels that constitute another one pair of the two pairs of wheels, is provided with a pressure-increasing control valve constituted by a normally-closed electromagnetic valve that is to be placed in a closed state when electric current is not being supplied to a solenoid thereof.

8. The brake system according to claim 1,
wherein said hydraulic brakes are provided for respective front right, front left, rear right and rear left wheels of the vehicle,
and wherein said brake cylinders of ones of said hydraulic brakes which are provided for the rear right and left wheels are connected to said common passage via a third individual passage,
said brake system comprising a third valve which is provided in said third individual passage and which is constituted by a normally-closed electromagnetic valve that is to be placed in a closed state when electric current is not being supplied to a solenoid thereof.

9. The brake system according to claim 8, comprising a rear-wheel-brake-cylinder-side check valve which is provided in parallel with said third valve,
wherein said rear-wheel-brake-cylinder-side check valve is configured to allow flow of a working fluid in a direction toward said common passage away from said brake cylinders of said ones of said hydraulic brakes which are provided for the rear right and left wheels, and to inhibit flow of the working fluid in a direction opposite to said direction toward said common passage away from said ones of said brake cylinders.

10. The brake system according to claim 1,
wherein said power hydraulic pressure source is connected to said common passage via a passage bypassing said high pressure generator,
said brake system comprising an output hydraulic pressure control device configured to control the hydraulic pressure outputted by said power hydraulic pressure source.

11. The brake system according to claim 1,
wherein said high pressure generator is disposed among said first brake cylinder, said second brake cylinder, said power hydraulic pressure source and said manual hydraulic pressure source,
and wherein said high pressure generator is to be activated mechanically by the hydraulic pressure of said manual hydraulic pressure source.

12. The brake system according to claim 11,
wherein said high pressure generator includes (a) a mechanical pressure-increasing device configured to increase the hydraulic pressure of said manual hydraulic pressure source and to output the increased hydraulic pressure and (b) a high-pressure-side check valve disposed between said mechanical pressure-increasing device and said power hydraulic pressure source,
and wherein said high-pressure-side check valve is configured to allow flow of a working fluid in a direction toward said mechanical pressure-increasing device away from said power hydraulic pressure source, and to inhibit flow of the working fluid in a direction opposite to said direction toward said mechanical pressure-increasing device away from said power hydraulic pressure source.

13. The brake system according to claim 12,
wherein said mechanical pressure-increasing device includes (a) a housing, (b) a stepped piston which is fluid-tightly and slidably fitted in said housing and which has a large diameter portion and a small diameter portion, (c) a large diameter chamber which is located on a side of said large diameter portion of said stepped piston and which is connected to said manual hydraulic pressure source, (d) a small diameter chamber which is located on a side of said small diameter portion of said stepped piston and which is connected to said brake cylinders, (e) a high pressure chamber to which said power hydraulic pressure source is connected, and (f) a high-pressure supply valve which is disposed between said high pressure chamber and said small diameter chamber and which is to be switched from a closed state to an open state by forward movement of said stepped piston,
wherein said high-pressure-side check valve is disposed between said high pressure chamber and said power hydraulic pressure source,
and wherein said high-pressure-side check valve is configured to allow flow of a working fluid in a direction toward said high pressure chamber away from said power hydraulic pressure source, and to inhibit flow of the working fluid in a direction opposite to said direction toward said high pressure chamber away from said power hydraulic pressure source.

14. The brake system according to claim 13,
wherein said high pressure generator includes a manual-side check valve disposed between said manual hydraulic pressure source and an output side portion of said mechanical pressure-increasing device,
and wherein said manual-side check valve is configured to allow flow of the working fluid in a direction toward said mechanical pressure-increasing device away from said manual hydraulic pressure source, and to inhibit flow of the working fluid in a direction opposite to said direction toward said mechanical pressure-increasing device away from said manual hydraulic pressure source.

15. The brake system according to claim 1, wherein said high-pressure-generator cut-off valve is constituted by a normally-open electromagnetic valve that is to be placed in an open state when electric current is not being supplied to a solenoid thereof.

16. The brake system according to claim 1, wherein said power hydraulic pressure source includes a pump device and an accumulator that is configured to store therein a working fluid discharged from said pump device.

17. The brake system according to claim 1,
wherein said power hydraulic pressure source is connected to said common passage via a passage bypassing said high pressure generator,
said brake system comprising an output hydraulic pressure control device configured to control the hydraulic pressure outputted by said power hydraulic pressure source,
wherein said pressure-supply control device includes an electromagnetic-valve controlling portion that is configured to place said high-pressure-generator cut-off valve, first valve and first manual-pressure-source cut-off valve in a closed state, an open state and a closed state, respectively, and to cause the hydraulic pressure controlled by said output hydraulic pressure control device to be supplied to said common passage in a state in which said common passage is isolated from said high pressure generator while said first brake cylinder is isolated from said manual hydraulic pressure source.

18. The brake system according to claim 1, comprising:

a fluid-leakage possibility detecting device configured to detect presence of possibility of fluid leakage in said brake system; and an electromagnetic-valve controlling portion configured to place at least said first valve in a closed state when the presence of possibility of fluid leakage is detected by said fluid-leakage possibility detecting device.

19. The brake system according to claim 1, wherein said high pressure generator is disposed among said first brake cylinder, said second brake cylinder, said power hydraulic pressure source and said manual hydraulic pressure source, and wherein said high pressure generator is to be activated mechanically by the hydraulic pressure of said manual hydraulic pressure source that is constituted by a pressurized chamber of said master cylinder.

* * * * *